United States Patent [19]

Murakami et al.

[11] Patent Number: 5,128,748
[45] Date of Patent: Jul. 7, 1992

[54] IMAGE PROCESSING SYSTEM AND APPARATUS FOR PROCESSING COLOR DOCUMENTS

[75] Inventors: Tatsuya Murakami; Masaaki Fujinawa, both of Tokyo; Hiromichi Fujisawa, Tokorozawa; Hidefumi Masuzaki, Hatano; Satoshi Ito, Odawara; Eiichi Hadano, Hachioji; Yasuo Kurosu, Yokosuka, all of Japan

[73] Assignee: Hitachi, Ltd., Tokyo, Japan

[21] Appl. No.: 479,615

[22] Filed: Feb. 13, 1990

[30] Foreign Application Priority Data

Feb. 15, 1989 [JP] Japan ................................ 1-33577
May 8, 1989 [JP] Japan ................................ 1-113708

[51] Int. Cl.[5] .............................................. H04N 1/40
[52] U.S. Cl. ............................................................ 358/75
[58] Field of Search .................. 358/75, 80, 456, 457, 358/459

[56] References Cited

U.S. PATENT DOCUMENTS

| 4,667,250 | 5/1987 | Murai ............................... 358/75 |
| 4,768,082 | 8/1988 | Hiratsuka et al. ................. 358/75 |
| 4,845,550 | 7/1989 | Urabe ................................ 358/75 |
| 4,910,589 | 3/1990 | Nagano et al. .................... 358/75 |
| 4,959,659 | 9/1990 | Sasaki et al. ...................... 358/75 |
| 4,967,264 | 10/1990 | Parulski et al. .................. 358/75 |

FOREIGN PATENT DOCUMENTS 122430 10/1984 European Pat. Off. .
3705873 8/1987 Fed. Rep. of Germany .
3736220 5/1988 Fed. Rep. of Germany .

OTHER PUBLICATIONS

Proceedings of the SID vol. 25 #4, 1984, Los Angeles. pp. 321-329; Kotera et al. "A Poster-Size Color Inkjet Printing System".

Primary Examiner—Stephen Brinich
Attorney, Agent, or Firm—Antonelli, Terry, Stout & Kraus

[57] ABSTRACT

A color document image processing apparatus comprising an image input means for inputting document image data including multivalue color image, a binarizing means for binarizing input document image data by a simple binarization or artificial binary-halftone process, an image memory means for temporarily storing image data binarized by said binarizing means, a codec means for executing predetermined coding for storing image data stored in the image memory means and executing decoding to the stored document image data, an image storing means for storing document image data encoded by the codec means, a binary-halftone transducing means for transducing binary image data decoded by the codec means into multivalue image data, and an image output means for outputting multivalue image data transduced by the binary-halftone transducing means.

39 Claims, 18 Drawing Sheets

FIG. 7

|   |   |   |   |   |   |
|---|---|---|---|---|---|
|   |   |   |   |   |   |
|   |   |   | 1 |   |   |
|   |   | 1 | 2 | 1 |   |
|   | 1 | 2 | ※ |   |   |

FIG. 8

| F$_{MD}$ | F$_{CM}$' | F$_{CP}$' | R | G | B |
|---|---|---|---|---|---|
| 1 | – | ∅ | – | ∅ |   |
|   | – | 1 | – | 1 |   |
| 2 | – | – | ∅ | ∅ | ∅ |
| 3 | ∅ | ∅ | ∅ | ∅ | ∅ |
|   | ″ | 1 | 1 | 1 | 1 |
|   | 1 | – | 1 | 1 | 1 |
| 4 | ∅ | ∅ | ∅ | ∅ | ∅ |
|   | ∅ | 1 | 1 | 1 | 1 |
|   | 1 | – | 1 | 1 | 1 |

FIG. 9
| MODE | F_CM' | F_RBH | F_RBL | Gs' | Rs' | Bs' | F_CMS' |
|---|---|---|---|---|---|---|---|
| MODE (I) | - | - | - | $G_{I2}'$ | $\phi$ | $\phi$ | - |
| MODE (II) | 1 | - | - | $G_{I2}'$ | $R_{I2}'$ | $B_{I2}'$ | - |
| | $\phi$ | - | - | $G_{I2}'$ | $G_{I2}'$ | $G_{I2}'$ | - |
| MODE (III) | - | 0 | - | $G_{I2}'$ | $\phi$ | $\phi$ | - |
| | - | 1 | 0 | $\phi$ | $\phi$ | $B_{I2}'$ | - |
| | - | 1 | 1 | $\phi$ | $R_{I2}'$ | $\phi$ | - |
| MODE (IV) | 1 | - | - | $G_{I2}'$ | $R_{I2}'$ | $B_{I2}'$ | 1 |
| | $\phi$ | - | - | $G_{I2}'$ | $\phi$ | $\phi$ | $\phi$ |
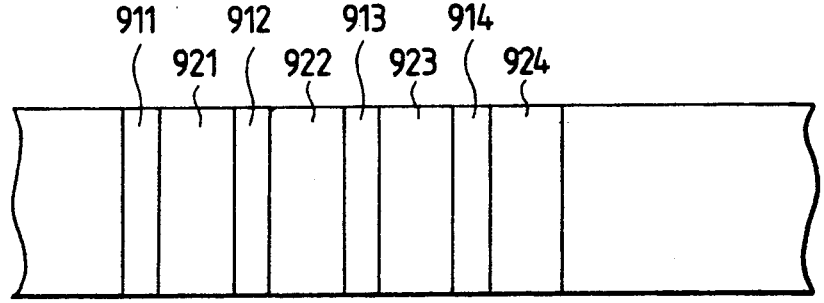
FIG. 10
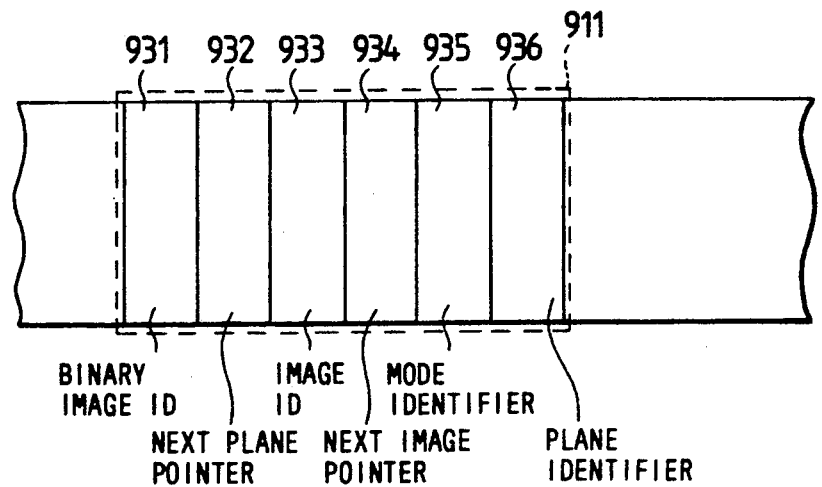
FIG. 11

FIG. 12

| FMD | FCM' | Go' | Ro' | Bo' |
|---|---|---|---|---|
| ØØ | - | Gs' | Gs' | Gs' |
| Ø1 | - | Gs' | Rs' | Bs' |
| 1Ø | - | Gs' | Rs' | Bs' |
| 11 | Ø | Gs' | Gs' | Gs' |
| 11 | 1 | Gs' | Rs' | Bs' |

FIG. 13

| OUTPUT MODE SIGNAL | Fs' | Go' | Ro' | Bo' |
|---|---|---|---|---|
| ØØ | - | Gs' | Gs' | Gs' |
| Ø1 | - | Gs' | Rs' | Bs' |
| 1Ø | - | Gs' | Rs' | Bs' |
| 11 | Ø | Gs' | Gs' | Gs' |
| 11 | 1 | Gs' | Rs' | Bs' |

FIG. 14

|  | x-2 | x-1 | x | x+1 | x+2 |
|---|---|---|---|---|---|
| y-2 | (x-2, y-2) |  |  |  | (x+2, y-2) |
| y-1 |  |  |  |  |  |
| y |  |  | (x,y) |  |  |
| y+1 |  |  |  |  |  |
| y+2 | (x-2, y+2) |  |  |  | (x+2, y+2) |

FIG. 15

| 1 | 2 | 4 | 2 | 1 |
|---|---|---|---|---|
| 2 | 4 | 8 | 4 | 2 |
| 4 | 8 | 16 | 8 | 4 |
| 2 | 4 | 8 | 4 | 2 |
| 1 | 2 | 4 | 2 | 1 |

IMAGE PROCESSING SYSTEM AND APPARATUS FOR PROCESSING COLOR DOCUMENTS

BACKGROUND OF THE INVENTION

The present invention relates to a system having the function for inputting, storing and retrieving images including color information such as color documents and the function for outputting such information to a display or printer and more specifically to an image processing system for effectively encoding images including monochro images and color images and displaying at a high speed the color images and monochro images during retrieval of information.

For storage and communication of image information, data has been encoded for suppressing redundancy and reducing quantity of information.

Meanwhile, in the case of an apparatus which processes color images as digital data, an image is input as the three kinds of multivalue (level) data generated by color decomposition to the three primary colors of red, green and blue (hereinafter, each element is called respectively as R, G, B and each color element data is written as R data, G data and B data). The color image is then output as the multivalue data or the input multivalue data is binarized and such binary data is output.

For example, a color duplicator directly outputs the input R, G and B multivalue image data. Meanwhile in case the binarization processing such as output to the printer is required, the multivalue RGB data are independently binarized for each color and are then output respectively. The known art which realizes improvement in function of this system is disclosed, for example, by the Japanese Patent Laid-open No. 63-174472. This known art teaches the system for calculating the luminousness information from R, G, B and changes the binarization system depending on the value of such information.

In general, it is desirable, for output of color images, to directly use multivalue data in order to maintain the quality of original images. However, in this case, quantity of data increases and the apparatus for processing data is also complicated. Moreover, an output apparatus such as a printer generally deals with the binary data and therefore the multivalue data must be binarized. However, in case the image data is processed as the binary data, the quantity of data is reduced and the data to be processed is also reduced in amount but image quality may be deteriorated.

In addition, the RGB data has a high correlation between three colors. Particularly, in the expression of monochro image, the R, G and B data have the equal value with each other. Accordingly, redundancy becomes high and encoding efficiency is lowered. The the part expressed as the monochro image in the image is called the monochro domain.

In the case of a color document, the mochchro domain occupies a greader part of text domain. Particularly, it is often seen that red or blue stamps are applied to the monochro document or document is corrected by red characters. These documents are formed by the monochro domain in its greater part.

Therefore, the system processing in direct the multivalue data of R, G and B is not suitable for electronic file system storing a great number of document and image data or facsimile (FAX) which is required to send document and image data at a low data transfer speed because the encoding efficiency for monochro domain is low.

Meanwhile, in TV or VTR, the system, in which the RGB color image data is converted into the luminousness information (hereinafter referred to as Y) and two kinds of chrominance information (hereinafter referred to as I and Q), has been widely employed and an example of using this system for document is also disclosed in the Japanese Patent Laid-open No. 63-9282.

However, the apparatus which conducts conversion to luminousness/chrominance carries out information compression by employing the encoding system for multivalue data such as the orthogonal conversion. However, when the encoding system for multivalue data is employed to document image, following problems rise.

(a) The encoding efficiency is remarkably lowered because concentration change of line and figure such as character is sharp.
(b) Direct output of signal is impossible for the apparatus which processes document as the binary image such as FAX and electronic file system.
(c) Compatibility of data with the conventional monochro system is deteriorated.

SUMMARY OF THE INVENTION

It is a first object of the present invention to provide a color document image processing apparatus which efficiently encodes or accummulate color document images and does not show distinctive deterioration of image quality during output of encoded or accummulated color document image data.

It is a second object of the present invention to provide a color document image processing apparatus which ensures compatibility with a conventional document image processing apparatus for monochro images.

It is a third object of the present invention to provide a color document image processing apparatus which efficiently encodes or accummulate a variety of document images including color documents and monochro documents. Particularly, the third object is intended to provide a color document image processing apparatus which effectively accummulates the images including monochro domains which is often seen in the color documents and ensures effective encoding for color documents, particularly those which require more effective storage of data rather than reproduction of color such as the document with correction by red ink or the like which is mainly occupied by the monochro domain.

It is a fourth object of the present invention to provide a color document image processing apparatus which is capable of displaying monochro images at a high speed on the occasion of retrieving contents of the large amount of color image data accummulated, for example, on the optical disk.

In order to achieve the first or second objects, the present invention comprises a means for inputting document image data including multivalue color images, a binarization processing means for binarizing input document image data by the simple binarization process or artificial binary-halftone process, a binary image data encoding means for conducting predetermined encoding to accumulate the binarized document data, an image storing means for storing encoded binary image data, a binary image data encoding means for encoding the accummulated binary document image data, a document image display transducing means for transducing the encoded binary image data into multivalue document image data, and an image output means for outputting the converted multivalue document image data as color image.

In order to achieve the third object with the system using the data of three primary colors of RGB, the present invention is first characterized in that the input multivalue color image data of RGB is processed respectively as the independent binary image data. Namely, the R data, G data and B data as the input multivalue color image data are respectively processed by the artificial binary-halftone processing method in the binarizing means to generate three binary image data (in this specification, the data of three primary colors of color image are respectively called the R data, G data and B data, and three binary image data to be used for expressing a single image are respectively called plane when these are indicated individually). Second, the present invention is also characterized in that a means for designating a kind (mode) of object image, a means for deciding to which domain of the color and monochro domains each part of image belongs and a selection means for selecting an output of the binarizing means depending on an output of these means are also comprised.

Here, designation of mode of object image is carried out by the following four modes. Mode (I) momochro mode:

Only the brightness data of image data is stored.

Mode (II) full color mode:

The color image data of R, G, B are stored respectively in the R, G, B planes.

Mode (III) multicolor mode:

Each part of image is separated into the monochro domain, red domain or blue domain by the input color image data and respective image data is stored in the individual planes.

Mode (IV) mixing mode:

The color domain which requires color data and monochro domain are identified from image and the brightness information or a single color data of RGB are stored for the monochro domain. Meanwhile, the binary data of R, G, B is stored in the respective plane for the color domain.

Here, the mode (I) is used for input of monochro document and processes only the brightness information of image. The luminousness data is usually calculated by calculation from the R data, G data and B data. However, such data can also be replaced, for example, by G data depending on the wavelength characteristic of an image input apparatus such as a scanner to which data is input.

The mode (II) is used for documents including the stamping marks or corrections in red or blue on the monochro document which are often seen offices.

In these documents, it is important that the marks and corrections are made by color inks such as red or blue and accurate reproduction of colors such as a color photograph is generally not required. Accordingly, these images are processed in the form of a monochro image data plus color image data. In more concrete, the lunimousness data is stored as G data of color image in question, the color image is assigned to "red" and "blue" and are recorded as the R plane and G plane. Therefore, the color image domain is stored by quantization to any of red or blue. In this case, the monochro image can be output as in the case of mode (I) by expressing only the G data.

The mode (IV) is used for documents including the monochro document and color photograph. The mode (II) described above expresses an image by three kinds of data of R, G and B data. Accordingly, the multivalue data of R, G, B take the same value in the monochro domain of an image. Therefore, in the monochro domain, redundancy can further be suppressed by storing only the luninousness data. For this purpose, the attribute of each part of image (identifier for color domain and monochro domain, hereinafter referred to as $F_{CM}$) is also recorded.

In the present invention, the RGB data are respectively stored in the independent three planes. Therefore, the one among R, G and B data is input as the luninousness data, various color images can be displayed as the monochro image at a high speed. Thereby, the fourth object can be achieved.

Moreover, in case the RGB data is once converted to the YIQ data and the document image is processed by the YIQ data, the present invention has the following characteristics.

First, for storage or transmission of document image, a RGB/YIQ transducing means for transducing the multivalue RGB data input by the image input to the multivalue YIQ data, a positive and negative data separating means for separating the positive and negative values from the I, Q data as the chrominance information from the transduced YIQ data and and obtaining a positive value, a binarization processing means for independently binarizing the four kinds of data separated by the positive and negative data separating means and the Y data as the brightness information by the artificial binary-halftone process, and a means for respectively encoding the binarized data are comprised. Moreover, a decoding means for decoding encoded five kinds of data, a binary-halftone transducing means for transducing the decoded data into the multivalue data, a positive and negative data composite means for combining the I, Q data indicating two kinds of chrominance data including a positive and a negative values from the four kinds of data indicating the chrominance information among the multivalue data obtained by the binary-halftone transducing means, and a YIQ/RGB transducing means for transducing the I, Q data indicating the chrominance information sent from the positive and negative data composite means and the Y data indicating the luninousness information obtained from the binary-halftone transducing means into the RGB data are also comprised.

In addition, a color image can be displayed as a monochro image by reading only the Y data indicating the luniousness information among the stored YIQ data. Further, in case the image data input as the multivalue data of RGB is transduced to the luninousness/chrominance signal, storage of a little amount of data can be stored effectively by binarizing and encoding the chrominance signal with the artificial binary-halftone processing so that quantity of data after the encoding is minimized when when the chrominance signal value is 0.

BRIEF DESCRIPTION OF THE DRAWINGS

FIG. 7 is a diagram mainly showing distribution of coefficient to be used for the average error minimization method.

FIG. 8 is a diagram for determining operation mode of the binarization process.

FIG. 9 is a diagram showing operations of input data selector.

FIG. 10 is a diagram showing the positional relation between data and directory on the occasion of writing binary image data on the optical disk.

FIG. 11 is a diagram showing an example of directory format on the occasion of writing binary image data on the optical disk.

FIG. 12 is a diagram showing operations of output data selector on the occasion of displaying an image input from an image reader.

FIG. 13 is a diagram showing operation of output data selector on the occasion of displaying images stored in the optical disk.

FIG. 14 is a diagram explaining a window on the occasion of recovering binary-halftone image data from a binary image data.

FIG. 15 is a diagram showing an example of weight coefficient on the occasion of recovering the binary-halftone image data from the binary image data.

DESCRIPTION OF THE PREFERRED EMBODIMENT

Prior to explaining a preferred embodiment of the present invention, the basic principle of the present invention will be first explained.

Figure 1:
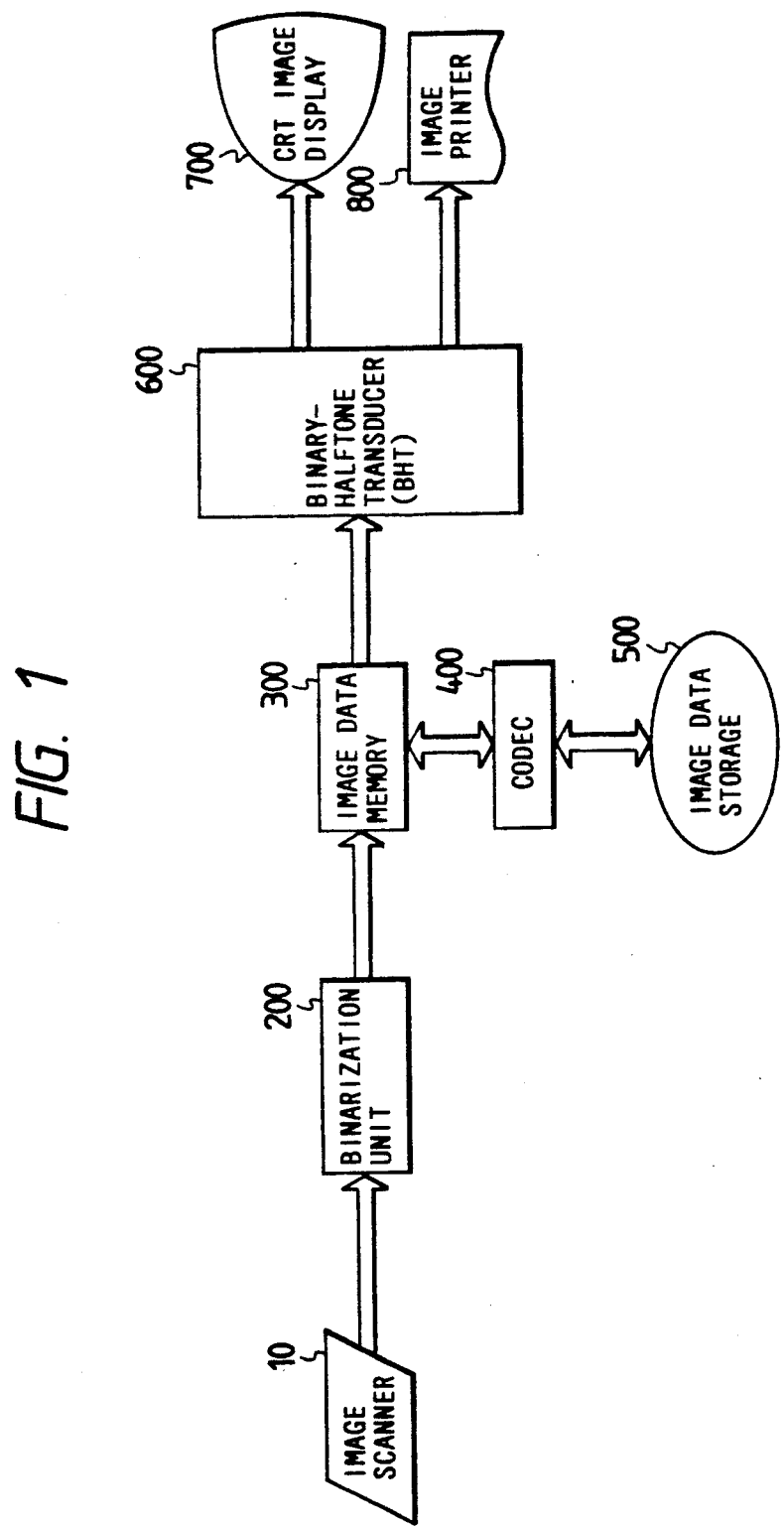
FIG. 1 is a diagram showing the basic principle of the present invention.

FIG. 1 is a diagram showing the basic structure of a color image processing apparatus proposed by the present invention.

In this figure, the numeral 10 designates an image scanner which reads color documents by the known means and outputs multivalue digital data; 200, a binarization unit for binarizing input multivalue digital data; 300, an image data memory for temporarily storing binary image data; 400, a codec for coding and decoding the binary image data by the known means; 500, an image storage for storing, for example, the encoded image data on the optical disk. Meanwhile, the numeral 600 designates a high speed binary-halftone transducer (BHT) for inputting a plurality of binary image data and generating multivalue color image data for display sent from CRT, etc. in order to output images read from the input or image storage; 800, an image display for displaying multivalue color image data; 700, a high resolution binary-halftone transducer for inputting a plurality of binary image data and outputting multivalue color image data; 900, an image printer such as a color printer.

Figure 2:
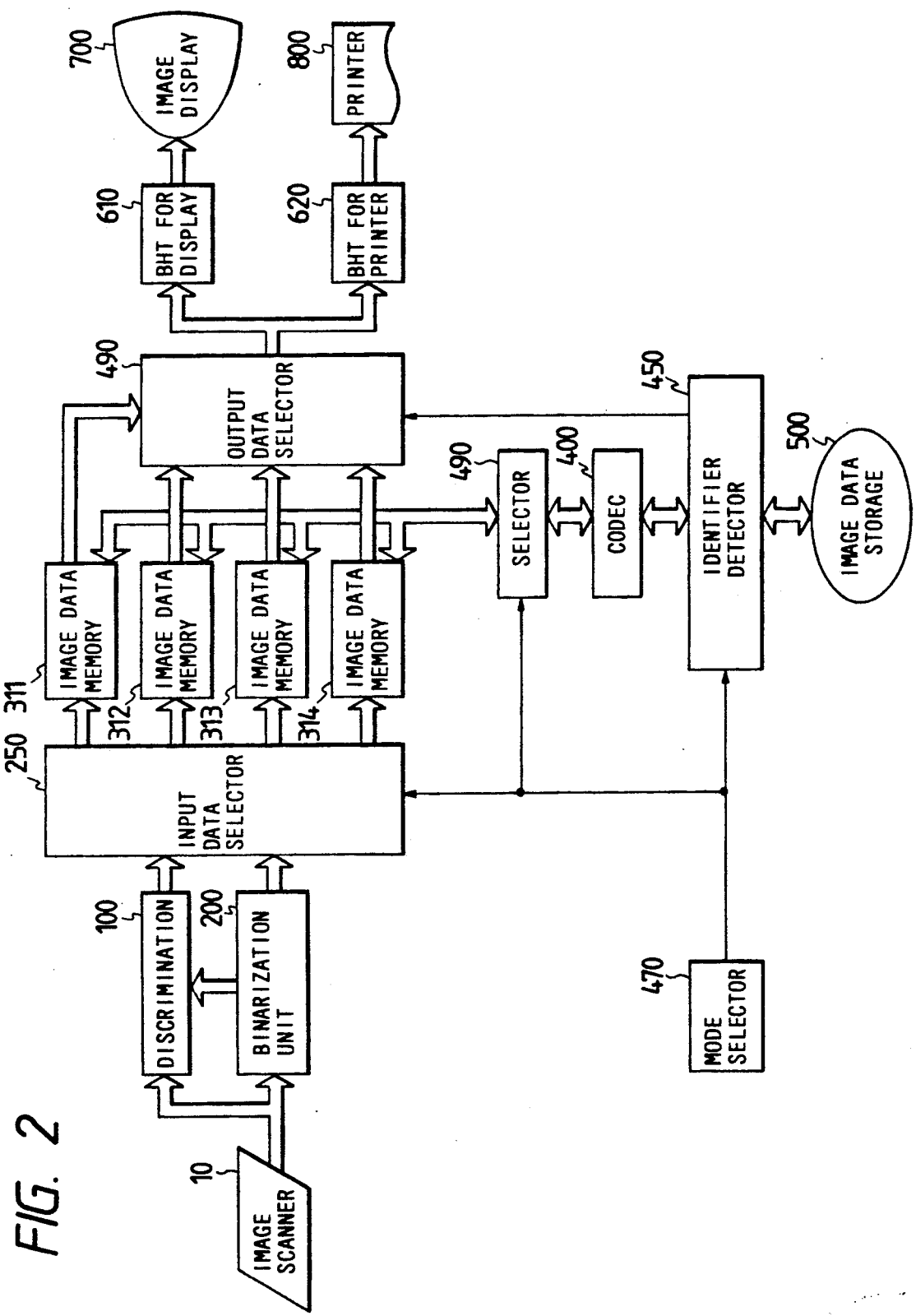
FIG. 2 is a diagram showing the basic structure of the present invention using the RGB data.

FIG. 2 is an example of basic structure for storing document image by the RGB data. In this figure, numeral 100 designates a domain discrimination unit for deciding character/photograph, color/monochro domains for each pixel of an image; 250, a selector for selecting data to be stored in the four image memories 311~314 depending on the preset mode and output from the domain discrimination unit.

The four memories 311, 312, 313, 314 respectively store the binary image data of RGB and output of the domain discrimination unit 100.

On the other hand, 490 designates an output data selector for selecting data to be used as each RGB data during output from the mode preset at the time of image input; 470, a mode selector for selecting the optimum mode depending on each image; 450, a mode identifier detector for detecting identifier which indicates the mode at the time of image input recorded together with each image from the data stored in the image storage 500.

Figure 3:
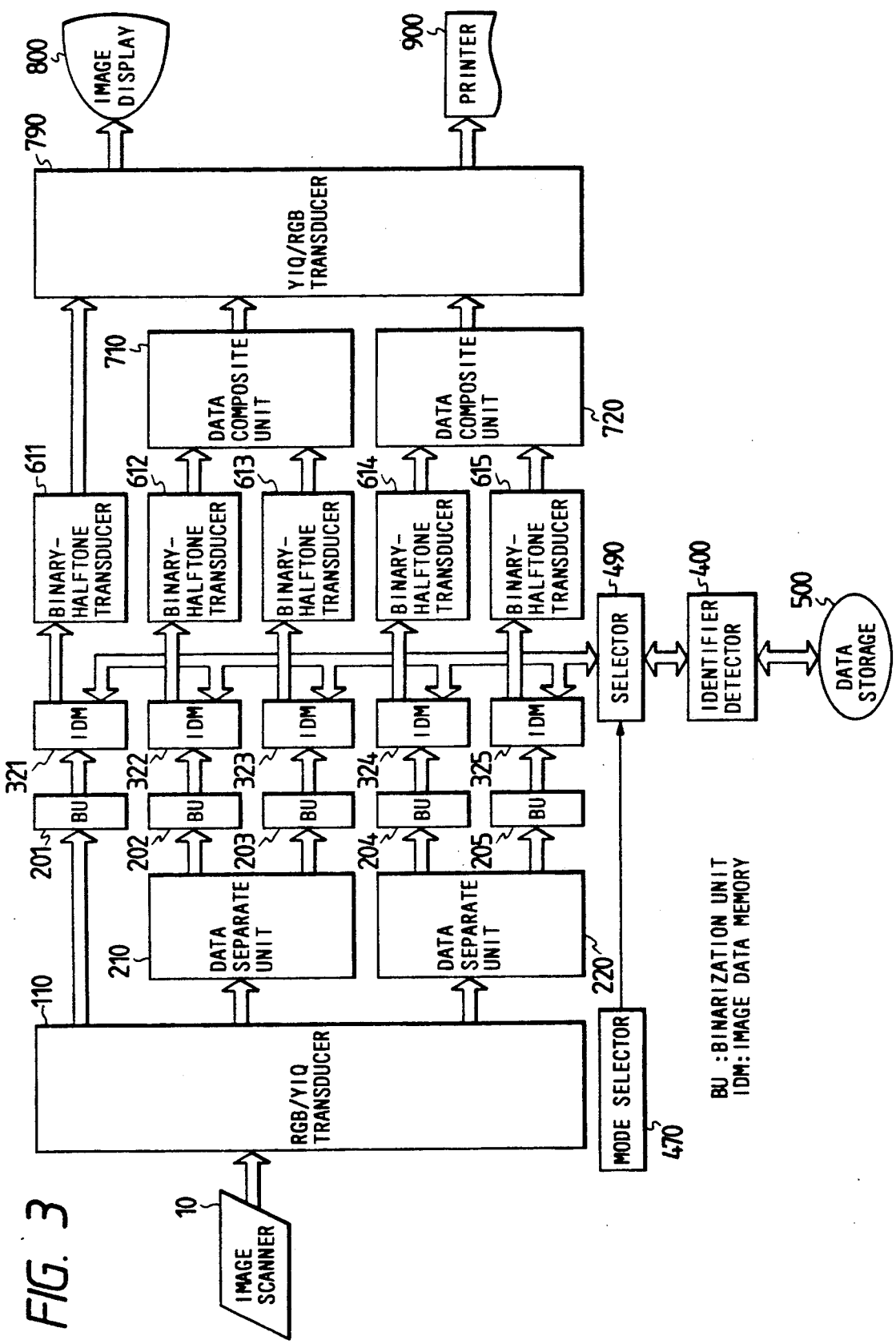
FIG. 3 is a diagram showing the basic structure of the present invention using the YIQ data.

On the other hand, FIG. 3 indicates an example of a structure of an image processing apparatus by the YIQ system. This system binarizes each data by the artificial binary-halftone processing and stores the data after conversion of multivalue RGB data to the multivalue YIQ data. At the time of outputting an image, a multivalue YIQ data is recovered from each binary data and it is then converted to the multivalue data of RGB. The RGB data input from the image scanner 10 is transduced into the brightness signal Y and two kinds of chrominance signals I and Q in the RGB/YIG transducer.

This conversion can be conducted, for example, by the matrix conversion indicated below.

$$\begin{bmatrix} Y \\ I \\ Q \end{bmatrix} = \begin{bmatrix} 0.30 & 0.59 & 0.11 \\ 0.60 & -0.28 & -0.32 \\ 0.21 & -0.52 & 0.31 \end{bmatrix} \times \begin{bmatrix} R \\ G \\ B \end{bmatrix}.$$

The I and Q signals indicating chrominance along the YIQ data have both positive and negative signs. Therefore, when these are binarized, encoding efficiency is lowered. Therefore, the I and Q are respectively separated into the image data $I_p$ and $Q_p$ consisting only of the positive pixels and the image data $I_n$ and $Q_n$ consisting of the absolute values of negative pixels by the positive and negative data separating units 210 and 220.

In more concrete, when I is positive, $I_p(x, y) = I(x, y)$
$I_n(x, y) = 0$
$I_p(x, y) = 0$
$I_n(x, y) = I(x, y)$ As a result, the three kinds of data of Y, I, Q are separated into five kinds of data of Y, $I_p$, $I_n$, $Q_p$, $Q_n$. These five kinds of data are binarized by the five binarization units 201, 202, 203, 204 and 205 and are independently stored in the image memories 321, 322, 323, 324 and 325 as the five binary image data Y', $I_p'$, $I_n'$, $Q_p'$ and $Q_n'$.

The image data can be recorded by reading sequentially the data in the image memories 321, 322, 323, 324, 325 by the selector depending on the mode and then recording these data to the image storage 500 through the identifier detector 400.

Here, the mode is selected by the mode selector 470 as in the case of the RGB system described above.

At the time of outputting an image data, the five binary image data Y', $I_p'$, $I_n'$, $Q_p'$, $Q_n'$ are respectively transduced into the multivalue data Y, $I_p$, $I_n$, $Q_p$ and $Q_n$ by the binary-halftone transducers 611, 612, 613, 614 and 615. Moreover, the I and Q signals separated into positive and negative signals at the time of input are combined again in the data composite units 710 and 720 to calculate the Y, I, Q signals.

Since the RGB data is generally used for output of image, YIQ signals are converted to the multivalue data RGB by the YIQ/RGB transducer 790 and are then output to the image display 800 or image printer 900. The YIQ/RGB conversion can be executed by inverse conversion of RGB/YIQ conversion explained previously. Next, an embodiment of the present invention applied to the system using the RGB data for data storage will then be explained hereunder.

Figure 4:
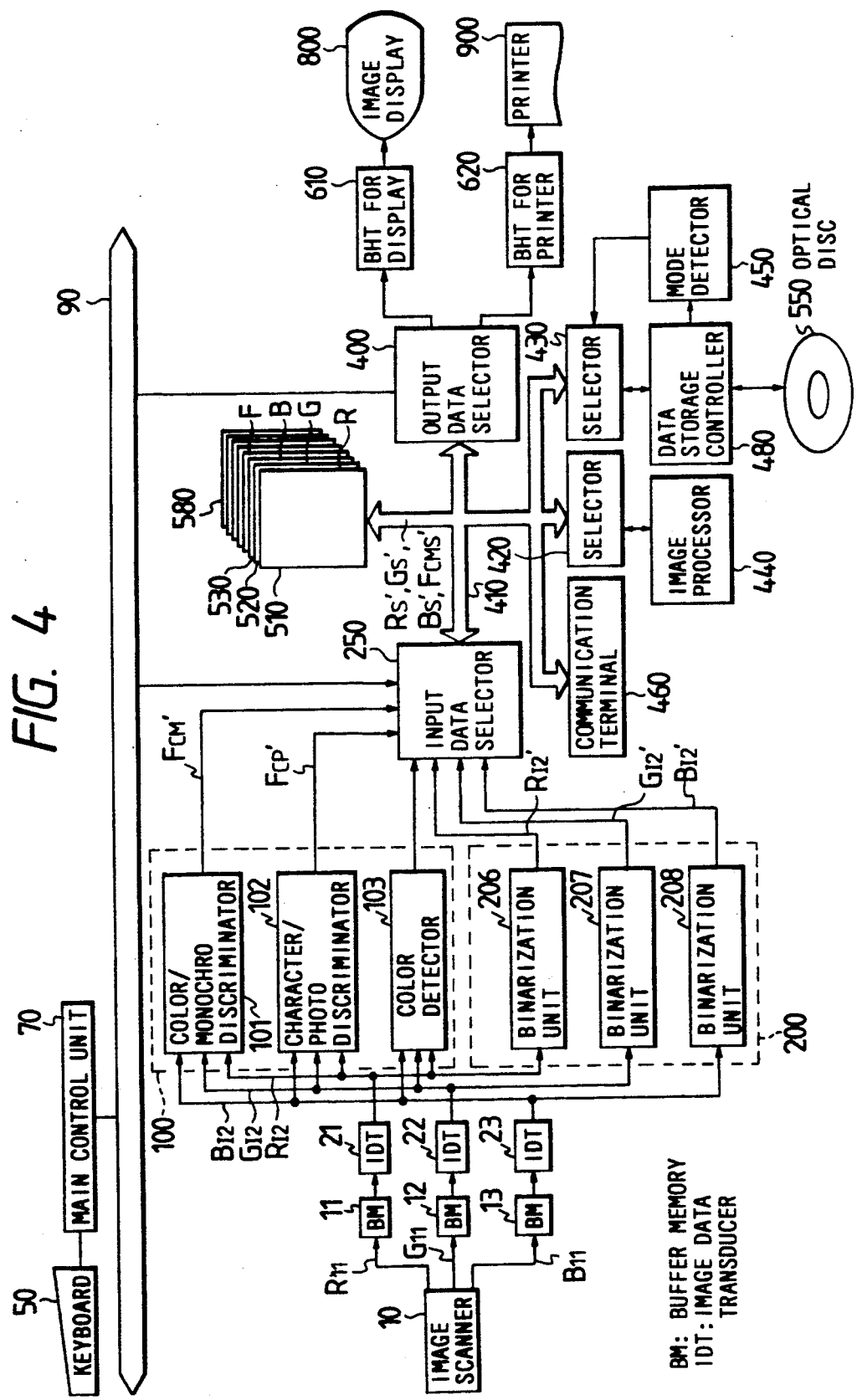
FIG. 4 is a block diagram showing an embodiment of the RGB system color document image processing apparatus of the present invention.

FIG. 4 shows a block diagram of this embodiment of the present invention. In this figure, numeral 10 is an image scanner which reads optically a document and outputs multivalue data of 8 bits for R, G, B data; 11, 12, 13, buffer memories for temporarily storing input image data; 21, 22, 23, image data transducers for transducing a value of multivalue image data; 50, a command input such as keyboard for inputting commands to the system from a user; 70, a main control unit for controlling operation of the system as a whole; a domain discriminator 100 comprises a color/monochro discriminator 101 which discriminates the color domain or monochro domain for each part of input image and outputs color/-monochro identifier $F_{CM}$, a character/photo discriminator 102 for discriminating the line and figure domain such as characer in the image and the domain such as photograph to be binarized by the artificial binary-halftone process from the input multivalue brightness data of R, G, B, and a color detector 103 which detects to which particular color such as red or blue the color indicated by each pixel of color domain belongs. 201, 202, 203 respectively designate binarization units for binarizing the input multivalue data in every R, G, B planes; 250, an input data selector for selectively outputting the binary image data of R, G, B and binary identifier $F_{CM}$ from the preset mode and output of color/-monochro discriminator 101; 510~590, memories for storing binary data; 410, data bus; 420 and 430, selectors for selecting only one data among those on the bus; 440, an image processor for conducting various data conversions such as encoding or decoding to the binary data by the known means; 480, a data storage controller for inputting or outputting encoded data or directory information to or from a large capacity data storage apparatus such as optical disk; 550, a large capacity data storage such as an optical disk; 450, a mode detector for outputting the mode signal to control operations of system by reading a kind and a mode of data from the directory information on the occasion of reading image data from the optical disk; 460, a communication terminal for transferring encoded image data; 400, an output data selector for selecting various data on the bus and outputting such data by an output from the mode detector 450; 610, a BHT for display for transducing the binary data of R, G and B sent from the output gate and then transferring such data to the display; 800, an image display such as colrod CRT for displaying image data of multivalue RGB; 620, a BHT for printer for transducing the binary data of R, G, B sent from the output data selector and then transferring such data to the printer; 900, a color printer for printing outputs from the BHT for printer 620.

First, flow of image data will be explained. The image data is input from the image scanner 10 as the 8 bits multivalue data of RGB. Thereafter, the input multivalue R, G, B data are respectively expressed as $R_1$, $G_1$, $B_1$ in this embodiment.

Here, it is considered that $R_{I1}$, $G_{I1}$, $B_{I1}$ are sequentially input for single scanning line from the image scanner 10. The input image is temporarily stored in the buffer memories 11, 12, 13.

For the color/monochro discrimination, since the multivalue data of the same pixel are necessary for R, G, and B, the memories 11, 12 are required to have the capacity to store at least the data of one or more scanning lines in this embodiment. Accordingly, in case the image scanner 10 scans the document for three times and outouts the R, G, B data of a single display screen for each scanning, the memories 21, 22 are required to have the capacity to store at least the data of a single display screen. In addition, in case the R, G, B data are output in repetition for each piexel, the memories 11, 12, 13 are enough to have the capacity for matching the timings. It is also applied to the case where the R, G, B data are input at a time from the image scanner 10 using the 24 signal lines.

The input $R_{I1}$, $G_{I1}$, $B_{I1}$ are respectively binarized in the binarization units 206, 207, 208 after the influence of wavelength characteristic of the image scanner is compensated in the image data transducers 11, 12, 13. Here, the transduced data are expressed as $R_{I2}$, $G_{I2}$, $B_{I2}$. Thereafter, in this embodiment, the parameters of binary data are given the apostrophe mark "'". Therefore, the binarized data of multivalue data is indicated as "$R_{I2}$'".

The internal structure and operations of binarization units 206~208 will be explained later in detail but these units comprises, for example, the means for executing the simple binarization process and artificial binary-halftone process and provides the function to select such process depending on an external command.

As a result of binarization process, the multi value color image data is transduced into three kinds of binary data $R_{l2}'$, $G_{l2}'$, $B_{l2}'$. In this embodiment, the G data is used in place of brightness data. Therefore, the binary image data $G_{l2}'$ may be dealt as the the monochro binary image.

Meanwhile, $R_{l2}$, $G_{l2}$, $B_{l2}$ are also input to the color/monochro discriminator 100, which outputs, by the known system, the binary color/monochro identifier $F_{CM}$ in unit of a constant number of pixels. In this embodiment, discrimination is carried out in unit of the one pixel and data "1" is output for the color domain, while "0" for the monochro domain.

The result of discrimination $F_{CM}'$ is input to the binarization units 206~208 and data selector 250.

On the other hand, the character/photo discriminator 102 inputs multivalue image data by the known system and outputs the binary domain identifier $F_{CP}'$ in unit of a constant number of pixels. In this specification, discrimination is carried out in unit of the one pixel and data "1" is output for the photo domain, while "0" for the character domain. The domain identifier $F_{CP}'$ is input to the binarization units 206~208 as the control signal.

The data selector 250 conducts logical calculation to the four kinds of binary data $R_{l2}'$, $G_{l2}'$, $B_{l2}'$ depending on the mode preset from an external device (keyboard 50) and color/monochro identifier $F_{CM}'$ and outputs the binary outputs $R_S'$, $G_S'$, $B_S'$, $F_{CMS}'$. Operations of output data selector 400 will be explained later but, in the case of mode (I), for example, only $G_S'$ is output and $R_S'$, $B_S'$, $F_S'$ are always "0".

The four kinds of binary data output from the input data selector 250 are stored respectively in the image data memories 510, 520, 530, 540 through the data bus 40. Each memory stores a kind of binary data as many as single display image. In this specification, this single image memory is respectively called the plane. These memories can also exist actually on a single memory board.

The selector 420 selects only one plane from the image memories 510~580 and connects it to the image processor 440. This processor 440 also has the encoding and decoding functions.

In case an image is stored, for example, in the optical disk or transferred using the FAX, the four encoded binary data are used. In more concrete, the four kinds of binary image data existing on the image memories 510~580 are selected by the selector 420 one by one for each memory and then input to the image processor 440. The image processor 440 encodes the input binary image data for each memory, for example, by the system such as MH, MR or MMR and transfers the data to the adequate plane in the image memories 510~580. The encoded data stored on the memory is selected by selector 430 for each plane and is sequentially transferred to the data storage controller 480, which stores each data and directory information corresponding such data in the optical disk 550. As a result, the encoded data to be recorded in the optical disk has the same format as the monochro binary image data.

Here, attribute of each data and input mode are recorded as the directory information. Moreover, in the case of mode (IV), like the image data, the binary color/monochro identifier $F_{CMS}'$ is also recorded as the encoded binary image data.

With the system mentioned above, the multivalue data $R_1$, $G_1$, $B_1$ of three images can be encoded and stored in the same format of the monochro binary data of a plurality of images.

On the other hand, following procedures are taken in case the encoded data stored, for example, in the optical disk are read and the color image is output. The one color image is recorded on the optical disk 550 as the binary image data of four images in maximum encoded by the system described above. Therefore, these data are read from images one by one by the data storage controller 480 and temporarily stored on the image memory. Thereby, three kinds of binary image data and color/monochro identifier $F_{CM}$ are obtained by the decoding in the image processor 440 and are then stored again in the memories 510, 520, 530 and 540 for each plane. In this case, prior to reading of image data, the directory information is read by the data storage controller 480. This data storage controller 480 detects, depending on the directory information, to which data of $R_S'$, $G_S'$, $B_S'$, $F_{CMS}'$ the data in question corresponds and controls the selector 430 depending on the result of detection. Thereby, the image data to be read is written into the adequate memory. Meanwhile, the data storage controller 480 also extracts the input mode of relevant image from the directory and controls the output data selector 400 based on the result of extraction. Structure and operation of output data selector 400 will be described later in detail as in the case of input data selector 250. For instance, when a color image is displayed on the color CRT 800, in the case of mode (I), a value of $G_S'$ as the brightness data is output respectively as the values of R, G, B.

With the system mentioned above, the binary image data $R_S'$, $G_S'$, $B_S'$ are obtained from the stored encoded data. Therefore, the means for displaying and outputting such image data will be explained next.

First, in case the color image display 800 has the function to display only the binary color image, the three kinds of binary data $R_S'$, $G_S'$, $B_S'$ on the image memories 510, 520, 530 are displayed in direct.

Meanwhile, when the color image display 800 corresponds to a full color image, the RGB data are respectively transduced into multivalue RGB data by the BHT for display 610, transferred to the color CRT 800 and is then output.

Here, the principle of the processing to obtain the multivalue data from the stored binary image data is as follow.

In general, in case a person sees an artificial binary-halftone image, concentration of a certain point on the artificial binary-halftone image can be felt depending on the distributing condition of black pixels in the neighborhood. Accordingly, in the case of binary image data obtained by conducting the artificial binary-halftone process to the multivalue image data, the multivalue image data equivalent to the original image for eyes of a person can be obtained by using distributing condition of binary data.

In more specific, the concentration of each pixel can be determined by scanning the original image through a scanning window of the particular size to detect the distributing condition of black pixels in the neighborhood for each pixel.

Based on the principle described above, the color image data input as the multivalue three primary colors of RGB are stored as the binary data of three images and it may be output after conversion to the multivalue data again.

In this embodiment, a display unit for displaying an image consisting of multivalue RGB data is called a "full-color CRT" and a display unit for displaying an image of binary RGB data is called a "color CRT".

Moreover, in the case of printer output, three kinds of binary data $R_S'$, $G_S'$, $B_S'$ output from the output data selector 400 are transduced by the BHT for printer 620 to the data format just suitable for output device connected to the system and thereafter is output to a printer 900 such as a color laser printer.

On the other hand, it is requested to display at a high speed the contents of each image for retrival of many images. In the case of the present invention, the image data $G_S'$ for which the brightness information is binarized is stored in the optical disk. This image data $G_S'$ indicates an image obtained by expressing the original image as the monochro artificial binary-halftone image. Therefore, for high speed display of an image in the optical disk, only the brightness information $G_S'$ among the four kinds of enocoded data is read and the it is input to the output data selector 400 after the decoding process.

The output data selector 400 transfers $G_S'$ as the binary data $R_S'$, $G_S'$, $B_S'$ of the BHT for display 610.

As a result, a monochro image can be displayed on the image display 800 when the signals of one plane among those of three planes which is required to form a color image is input.

In addition, in the system for monochro image, such processing is carried out without any condition. Therefore, the brightness data $G_S'$ can be displayed/output as the monochro image.

Next, an example of the internal structure of the circuits which has been explained will then be described in detail.

The image data transducers 11, 12, 13 are first described. The image data transducers 11, 12, 13 transduce the multivalue color images $R_{f1}$, G, $B_{f1}$ input from the image scanner 10 to output the multi value color image data $R_{f2}$, $G_2$, $B_{f2}$. In general, since the multivalue image data output from the image scanner 10 is influenced by the wavelength characteristics of image scanner to a large extent, such influence mult be eliminated. In more concrete, such influence can be eliminated by three ROMs or RAMs. When RAMs are used, it is also possible to sequentially generate the data by external designation. In this case, concentration and chrominance of image can be changed freely.

In this embodiment, outputs of the image data transducers 11, 12, 13 are processed as the color image data.

Next, the color/monochro discriminator 101 will be explained. This color/monochro discriminator 101 outputs the binary color/monochro identifier $F_{CM}'$ in unit of pixel or constant domain from the multivalue color image data $R_{f2}$, $G_{f2}$, $B_{f2}$.

In the present invention, this discriminator is provided for the following three purposes.

(1) In the case of mode (IV), redundancy of data in the monochro domain is suppressed.

(2) In the modes (II) and (IV), the values of $R_{f2}'$, $G_{f2}'$, $B_{f2}'$ are set equal for the monochro lines and figures. (The pixels generating difference between $R_{f2}'$, $G_{f2}'$ and $B_{f2}'$ are output in the color other than white or black.)

(3) In the mode (III), the part to be quantized to red and blue is extracted.

As a concrete discriminating means, many systems have already been known and these can also be applied.

In the present invention, since the color/monochro discrimination is carried out as explained above, the white domain may be discriminated as the color image or monochro image. Therefore, when a character is thought, for example, as the text domain including the white background in the periphery of character, the color domain and monochro domain generally have constant area respectively. In addition, in the actual apparatus, it is probable that the RBG signals input as the data of the same pixel from the image scanner do not strictly become the value of the same position. In this case, the pixels on the boundary of white and black are sometimes considered as the color domain because the values between RGB are different.

Accordingly, the identifier may be possible, for example, to be output in unit of the domain of about $8 \times 8$ pixels, considering that the color/monochro identifier is stored in the mode (IV).

Next, the character/photo discriminator 102 will be explained. This discriminator is provided for conducting optimum binarization process for the object images. For this purpose, outputs of this discriminator is sent to three binarization units 201, 202, 203. Moreover, when difference is generated among three kinds of color image data R, G, B, quality of image obtained by the binarization process is deteriorated. Accordingly, this character/photo discriminator 102 executes discrimination for the single data such as the brightness information. In this embodiment, since the G data is used as the brightness data, only the multivalue data $G_{f2}$ is input.

As a result, the character/photo discriminator 102 executes discrimination by the real-time processing while allowing the input of the multivalue brightness data in the unit of pixel and outputs the binary domain discrimination result. Various prior arts are already proposed as the concrete methods for discriminating character and photograph domains and the Japanese Patent Laid-open No. 63-316566 proposes a method satisfying the conditions described above.

Figure 5:
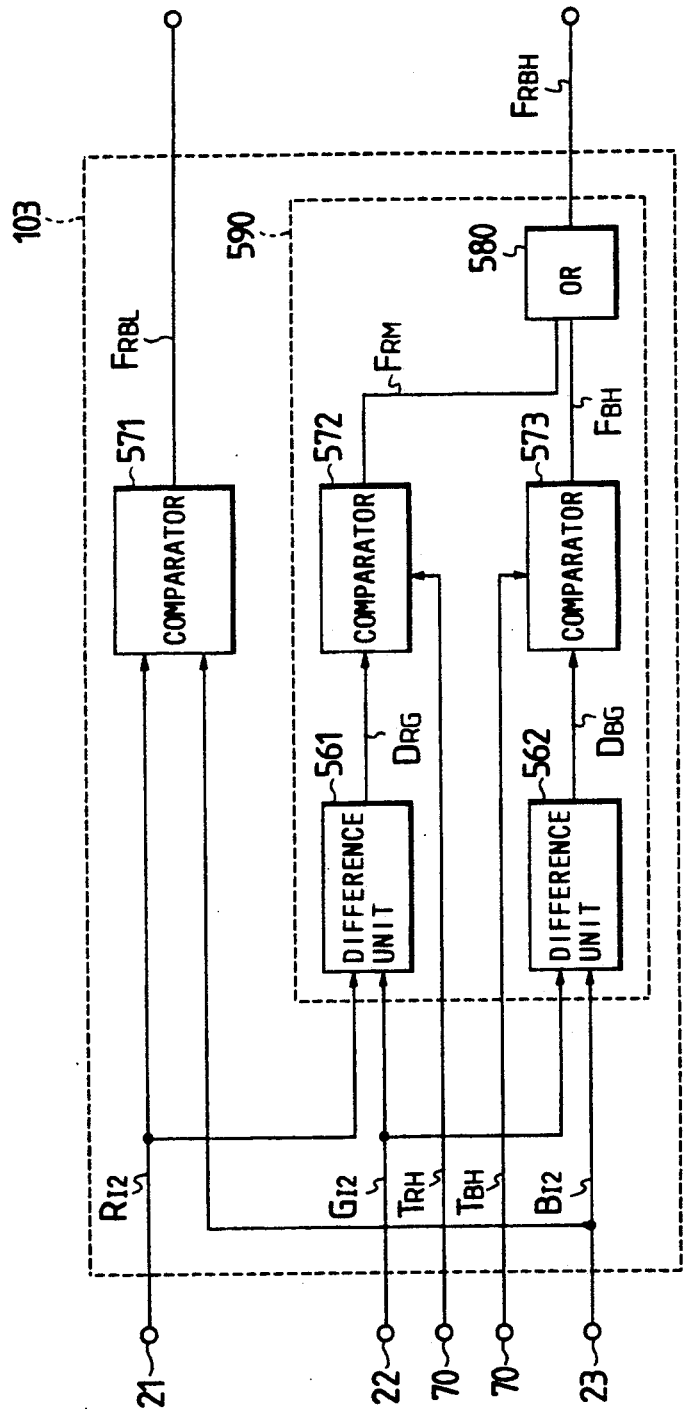
FIG. 5 is a diagram showing a structure of a color detector.

Next, the color detector 103 will then be explained. In case the mode (II) is set, the color detector 103 detects to which particular color, for example, such as red or blue the color displayed by each pixel in the color domain belongs. FIG. 5 shows an example of a structure of the circuit to assign the display color to any one of the red and blue. In this figure, 561, 562 designate difference units for detecting difference between two kinds of multivalue data. 571, 572, 573, comparators and 580, an OR gate for outputting logical sum. Here, the comparator 571 inputs $R_{f2}$, $B_{f2}$ and outputs the binary data $F_{REL}$ under the following conditions.

if $R_{f2} \geq B_{f2}$ then $F_{RBL} = 1$ $R_{f2} < B_{f2}$ then $F_{RBL} = 0$

This binary data $F_{REL}$ is an identifier which shows to which color of red and blue the color displayed by each pixel belongs The identifier has the data "1" for the color similar to red, while "0" for the color similar to blue.

On the other hand, the difference units 561, 562 outputs differ $D_{RG}$ and $D_{BG}$ of $R_{f2}$, $G_{f2}$ and $G_{f2}$. These differences $D_{RG}$ and $D_{BG}$ are respectively compared with the predetermined threshold values $T_{CR}$ and $T_{CB}$ in the comparators 572, 573. The comparators 571, 572, 573 output the binary data $F_{RH}$, $F_{BH}$ under the following conditions.

if $D_{RG} \geq T_{CR}$ then $F_{RH} = 1$ $D_{RG} < T_{CR}$ then $F_{RH} = 0$ if $D_{BG} \geq T_{CB}$ then $F_{BH} = 1$
$D_{BG} < T_{CB}$ then $F_{BH} = 0$ Next, the OR gate 580 obtains the logical sum $F_{RBH}$ of these two kinds of binary data.

This logical sum $F_{RBH}$ is the identifier to indicate red or blue to be displayed, and white or black to be displayed for each pixel. In some cases, the identifier $F_{RBH}$ may be replaced with the color/monochro identifier $F_{CM}$ output from the color/monochro discriminator 101. In this case, the circuit enclosed by a dotted line 590 is unnecessary. However, in the object document of the mode (II), the boundary between the monochro domain and color domain is often unclear. For instance, when a red stamp is marked on a black character, the attribute must be changed in unit of pixel. Therefore, when an output of the color/monochro discriminator 101 is formed, for example, in unit of 8×8 pixels, it is effective to use this structure in such a form as it is operated only when the mode (II) is set.

Next, structure and operation of three binarization units 201~203 shown in FIG. 4 will be explained. In this embodiment, three units employ the same structure.

Figure 6:
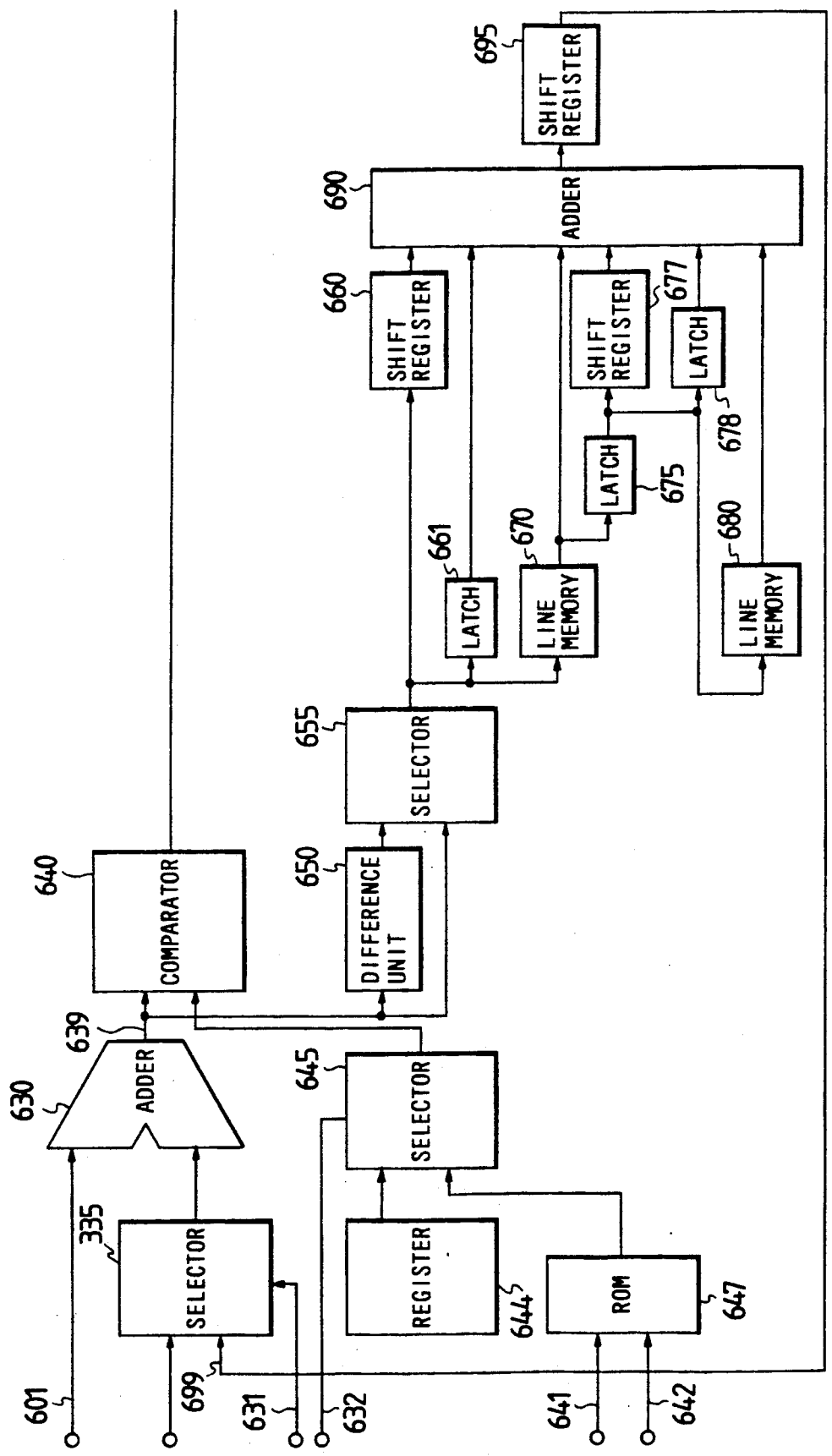
FIG. 6 is a diagram showing a structure of binarization unit.

For the binarization, various conventional binarization processing systems may be used. Optimization can be realized depending on the object image and characteristic of output apparatus by comprising a plurality of binarization systems and selecting adequate system in accordance with the mode designation $F_{MD}$ from external circuit and the color/monochro discrimination result $F_{CM'}$. FIG. 6 shows an example of a structure of the binarization unit 200 used in this system. This example shows a structure to select one binarization system from the three systems of the artificial binary-halftone process by the organic dither system, artificial binary-halftone process by the average error minimization method and binarization by fixed threshold value. In FIG. 6, the multivalue data $R_{j2}$ is input from the signal line 601, while the signal for designating the artificial binary-halftone processing system from the controller 70 is input from the signal lines 631, 632 and the lower bits of address of the main scanning direction and subscanning direction of output image is input from the signal lines 641, 642, respectively. The multivalue image data $Y_1$ (x,y) is input to an adder 630 through the signal line 601 from the image data transducer 21 and color/monochro discriminator 100. The adder 30 adds $Y_1$ (x,y) and error data E (x,y) input from the selector 635 and outputs a multivalue data F (x,y). Here, the error data E (x,y) is generally zero and and a value input from the signal line 699 only when the average error minimization method as the binarization system is used. Accordingly, the selector 635 usually outputs 0, except for the case where the average error minimization method is designated as the processing system. The multivalue data F (x,y) is input to the comparator 640 through the signal line 639 and is compared with the threshold value T. As a result of comparison, the binary image data Y'$_3$(x,y) is determined. Here, the threshold value T is also selected by the selector 645 based on the binarization system. Selection is carried out conforming to the designation input through the signal line 632 from an external circuit. In the case of organic dither system, the threshold value changes periodically in accordance with the position of pixel to be output. In this case, for example, the lower bits of address of the main scanning direction and subscanning direction of output image are input to ROM 47 and an output thereof is used as the threshold value. A matrix of threshold value is entered in ROM 647. In addition, in the case of a fixed threshold value, the fixed value output from a register 644 is selected.

In the case of average error minimization method, an error data E (x,y) must be calculated for the binarization process. This error data E (x,y) is a sum of the error $\epsilon$ generated when the multivalue data F in the vicinity of (x,y) binarized until this timing is binarized and a value obtained by multiplying the predetermined weight coefficient $\delta$ (m,n) to such error. An example of weight coefficient $\delta$ (m,n) is shown in FIG. 7. In this figure, the asterisk mark * indicates the pixel for binarization in this timing and corresponds to the coordinates (x,y) described here.

Next, operations of respective circuits will then be explained. In case the weight coefficient is as shown in FIG. 7, the error E (x,y) can be obtained from the following formula.

$$E(x,y) = \tfrac{1}{8}[\epsilon(x-1,y-1) + \epsilon(x+1,y+1) + \epsilon(x-2,y) + \epsilon(x,y-2) + 2\{\epsilon(x,y-1) + \epsilon(x-1,y)\}]$$

Meanwhile, the error $\epsilon$ of each pixel is any one of the difference between the multivalue data F and 0 or the difference between F and the maximum value $F_{max}$ of F. This value can be obtained by the following procedures. In case the comparator 640 binarizes the multivalue data $F(x_2-1, y_2)$ of the coordinates $(x_2-1, y_2)$ in a certain timing, the value F $(x_2-1, y_2)$ is input to the difference unit 650 and selector 655 in addition to the comparator 640. The difference unit 655 outputs a difference the maximum value $F_{max}$ of the transduced image data F (x,y) and F $(x_2-1, y_2)$ and sends this difference signal to the selector 655. For example, when $S_2$ (x,y) takes a value from 0 to 255, $F_{max} = 255$. The difference unit 650 outputs $255 - S_2 (x_2-1, y_2)$. Here, if F $(x_2-1, y_2) > F_{max}$, the difference unit 650 outputs 0. The selector 650 outputs any one of F $(x_2-1, y_2)$ or $F_{max} - F (x_2-1, y_2)$ as the error $\epsilon(x_1-1, y_1)$ under the following conditions.

$\epsilon(x,y) = F(x,y) : Q(x,y) = 0$ $F_{max} - F(x,y) : Q(x,y) = 1$

The error $\epsilon$ $(x_2-1, y_2)$ output is sent to the line memory 670 passing through the signal line 659. The processing for obtaining E (x,y) from the error $\epsilon$ is executed by the latches 661, 675, 678 and shift registers 660, 677. Next, operations of respective circuits will be explained based on the case for obtaining Q (x,y). When the binary data Q (x−1, y) is determined by the binarization unit, the errors $\epsilon$ (x−1, y), $\epsilon$(x−2, y), $\epsilon$(x, y−1), $\epsilon$(x−1, y−1), $\epsilon$(x+1, y−1), $\epsilon$(x, y−2) are respectively output from the latches 661, 675, 678 and line memories 670, 680. Here, the output data $\epsilon$ (x−1, y), $\epsilon$(x, y−1) of selector 350 and latch 678 are input to the shift registers 660, 677 and thereby 2* $\epsilon$(x−1, y) and 2* $\epsilon$(x, y−1) are output therefrom. The adder 690 calculates 8*E(x,y) by adding six kinds of multivalue data input and sends a result to the shift register 695. The shift register 695 obtains E (x,y) by shifting the input multivalue data. The E(x,y) obtained is input to the selector 635 by the signal line 699. Here, the selector 635 outputs E (x,y) or 0 to the adder 630 with the data E flag sent by the signal line 631 from an external circuit. When an output of selector 635 is E (x,y), the final output Q becomes the artificial binary-halftone image. Meanwhile, when an output of selector 635 is 0, the final output Q becomes a simple binarization image by the fixed threshold value.

When $x=1$ or $y=1$, a part of $\epsilon$ required to obtain E (x,y) sometimes does not exist. In this case, for example, E (x,y) is determined using a value recorded previously in the line buffers 650 and 655.

Next, the binarization system selecting method to be executed in the binarization unit will be explained Selection is carried out in the following two steps.

First, the simple binarization and artificial binary-halftone processing by the fixed threshold value are selected. Next, when the artificial binary-halftone processing is selected, the concrete processing system is determined.

The first determination for the first simple binarization process and artificial binary-halftone process is carried out by the preset operation mode $F_{MD}$ and two kinds of identifier $F_{CM}'$ and $F_{CP}'$. Conditions and selection result are shown in FIG. 8. In this figure, the outputs R, G, B indicate outputs of respective planes. The sign $\phi$ indicates selection of simple binarization, while 1, artificial binary-halftone processing.

In this embodiment, two kinds of organic dither method and average error minimization method can be executed as the artificial binary-halftone processing system. These two kinds of systems are preset depending on the object image and selection by user. Setting is carried out from the keyboard 50 shown in FIG. 4. For instance, when the organic dither method is used for the mesh image of single color, image quality is deteriorated because moiré is generated by interference of the period of original mesh image and period of dither matrix of binarization. This problem can be solved, for the original mesh image, by executing the binarization with the system having no periodicity such as the average error minimization method.

Accordingly, the range of selection for processing system can be widened since the binarization of image scanner to be connected to the system includes at least a kind of artificiall binary-halftone processing system having no periodicity such as the average error minimization method.

With the structure mentioned above, the multi value color image data $R_{\Omega}$, $G_{\Omega}$, $B_{\Omega}$ and three kinds of binary image data $R_{\Omega}'$, $G_{\Omega}'$, $B_{\Omega}'$ are calculated and then transferred to the input data selector 250.

Next, the input data selector 250 will then be explained in detail. The input data selector 250 determines and outputs the four kinds of binary data $R_S'$, $G_S'$, $B_S'$, $F_{CMS}'$ from the four kinds of input binary data $R_{\Omega}'$, $G_{\Omega}'$, $B_{\Omega}'$, $F_{\Omega}'$ depending on the preset mode $F_{MD}$ signal and identifiers $F_{CM}'$, $F_{TP}'$, $F_{RB}$.

The operating conditions are as shown in FIG. 9. For instance, in the mode (I), only $G_{\Omega}'$ is output as $G_S'$ and $R_S'$, $B_S'$, $F_S'$ are set to always "0". In the mode (II), any one of $R_S'$, $G_S'$, $B_S'$ is output and the others are always set to "0".

The four kinds of binary data output from the input data selector 250 are respectively stored as the binary image data to the image memories 510, 520, 530 and 540. The image memories 510 580 may be realized in actual with a sheet of memory board. A single or more sheets of binary image data of object document image is necessary for each plane as the capacity. Moreover, as a whole, the capacity of eight (8) planes or more is necessary for storing four sheets of binary image data input from the input data selector 250 and effectively executing the image processing described later. For example, in case the document of size A4 is input with the resolution of 16 lines per mm, each plane requires the capacity of 2 MB or more and 16 MB and total capacity required is 16 MB or more.

Next, this image data can be stored in an optical disk in the same way as storing four sheets of monochro binary image. The selector 420 sequentially selects a single line of data bus 410 to transfer the four kinds of binary image data sheet by sheet to the image processor 440. The image processor 440 executes the encoding of binary image data, for example, with the known means such as MH coding or MMR coding method. The encoded data is written on an optical disk 550 through the data storage controller 480. Meanwhile, the encoded data may also be transferred to an external circuit by connecting a communication terminal 460. As the communication terminal, those which can process the encoded data of binary image may be used and therefore, FAX, for example, can also be connected. The ordinary apparatus using MH code or MMR code can minimize quantity of data after encoding, in case zero (0) continues on the scanning lines. Accordingly since $R_S'$, $B_S'$, $F_{CMS}'$ are always "0" in the the monochro domain in the input image, quantity of data after encoding can be minimized. Therefore, even in case an image including color image and monochro image is to be processed, quantity of data of monochro domain may be minimized, resulting in a high encoding efficiency.

Next, a recording format and a directory format in the case of storing data in the optical disk will be explained. FIG. 10 is an example of a recording format in the optical disk. The rectangulars 911~914 in FIG. 10 respectively show the part for entering the directory of a sheet of binary image, while the rectangulars 921~924 show the part for entering the binary image data of a sheet of binary image.

In the case of this embodiment, a sheet of color image data is recorded in the optical disk as the four sheets of binary image data. In this case, four sheets of directory of image data are recorded in the optical disk. Here, both image data and directory are entered sequentially as $R_S'$, $B_S'$, $F_{CMS}'$, following the brightness data $G_S'$.

FIG. 11 shows a part of format in the directory 911. This format is similar to that of 912~915. In FIG. 11, 931 is a peculiar number as the binary image, namely a binary image ID added to each plane; 932, a next plane pointer indicating the position of next plane; 933, an image ID as a peculiar color image number; 934, a next image pointer indicating the next document image data position; 935, a mode identifier set during image input; 936, a plane identifier which indicates a kind of data among $R_S'$, $G_S'$, $B_S'$, $F_{SCM}'$.

Next, the processing for displaying the image recorded in the optical disk will be explained.

First output operation of color image will be explained. Reading of data is executed in the following procedures. With instruction to execute the retrieval, the four sheets of binary data $R_S'$, $G_S'$, $B_S'$, $F_{SCM}'$ matching with the image for which the peculiar number of color image is designated are sequentially read from the optical disk 550. Reading is executed together with the directory corresponding to the image data by the image data storage controller 480. Here, the directory information is sent to the mode detector 450. The mode detector 450 extracts content of mode identifier in the mode identifier column 935 and then outputs it to the output data selector 400. This output data selector 400 will be explained later. Moreover, the mode detector 450 also detects the plane identifier in the column 936 in the same way and then outputs it to the selector 430. The four sheets of binary image data $R_S'$, $G_S'$, $B_S'$, $F_{SCM}'$ read sequentially by the selector 430 are written into the image memory assigned to respective plane.

Meanwhile, an image to be displayed is a monochro image, it can be detected that the image is the monochro image for which only the brightness information is recorded, by extracting the mode identifier by the mode detector 450 shown in FIG. 4. In this case, only the binary image data $G_S'$ which indicates the brightness is read.

Moreover, in case content of image is displayed within a short period of time, only $G_S'$ is read from the four sheets of binary image data being stored and it is output as the monochro image after the decoding. In this case, with the command input from the keyboard 50, the plane identifier in the directory information reads only the image data of $G_S'$ sequentially among the image data as the retrieval object and is then writes such image data into the corresponding plane of image memories 510~580.

With such structure, an image processing apparatus which effectivelty stores the color image data and displays monochro image at a high speed in addition to color display at the time of output can be realized.

Next, compatibility with the apparatus for the monochro binary image will be explained. For example, an electronic file apparatus has been intended to monochro binary image. The output operation of image input and stored by such apparatus will then be explained. An image data input by the apparatus of prior art intended to monochro image is the binary image of brightness information. The present invention provides a means for outputting in direct the binary image of brightness information stored in the optical disk, as described previously. Therefore, an image input by the conventional monochro image apparatus can be output by the following method.

In this case, the internal structure of directory 911 shown in FIG. 10 is the same as that shown in FIG. 10. Here, the domain for entering each item as the binary monochro image such as the column 931 for binary image ID as the binary image and the next plate page pointer 932 indicating the next binary image position has the same format as the directory format in the conventional monochro image apparatus. As a result, the image data input by the monochro apparatus of prior art can also be output as the monochro image by the apparatus of the present invention.

On the other hand, for entry of data with this apparatus, the peculiar number of image ID assigned for each color image is entered to the column 933 and the pointer address indicating the next brightness data position to the column 934, in addition to respective items mentioned above. Even in case the image to be input is monochro image, the image ID is newly entered and the pointer address of the next image data is entered to the column 934. Moreover, the the mode identifier indicating monochro mode input is entered to the column 935, while the plane identifier indicating the brightness data of relevant plane to the column 936. As a result, the image data recorded in the optical disk by the apparatus described in the present invention can be retrieved and output even by the monochro apparatus of the prior art.

Next, the output operation of image stored in the memory will be explained. The data stored in the memory is input in the same way as the input from the optical disk even in case it is input from the image scanner 10 shown in FIG. 4 through the input data selector 250 and only the input route of items for determining operations of output data selector 400 is different.

First, display of binary color image on the memory on the image display 800 will be explained. The binary image data $R_S'$, $G_S'$, $B_S'$ and color/monochro identifier $F_{CM}'$ on the image memories 510~540 are transferred to the output data selector 400 in accordance with the display command.

Here, the output data selector 400 determines and outputs the three kinds of output color image data $R_0'$, $G_0'$, $B_0'$ from the color/monochro identifier $F_{CM}'$, mode identifier $F_{MD}$ and the color image data $R_S'$, $G_S'$, $B_S'$ input, in the same way as the input data selector 250, by the output mode signal sent from the mode detector 450.

This operating condition is the same as that in FIG. 12 and FIG. 13. FIG. 12 is applied for display of data input from the image scanner 10, while FIG. 13, for display of data read from the optical disk. The output data selector 400 has a role to output values of $G_S'$ as $R_0'$, $G_0'$, $B_0'$ for the monochro image and $R_S'$, $G_S'$, $B_S'$ for other cases. The three kinds of binary image data output are transduced to three kinds of multivalue image data $R_0$, $G_0$, $B_0$ by the BHT for display 610 shown in FIG. 4 and are then output to the bit map memory of the image display 800. The operation principle of the BHT for display 610 will be described later in detail.

On the other hand, for the high speed display of image in such a case of searching the content of image data stored in the optical disk, the output data selector 400 is set in the same condition as the display of monochro image. In this case, the monochro image can be displayed only with the binary data $G_S'$ as the brightness data. Accordingly, reading of only a sheet of binary data among four sheets of data realizes output of the monochro image on the image display 800 by reading only $G_S'$ of each color image from the optical disk. In this case, the display speed obtained is equal to that in output of monochro binary image.

Moreover, when the monochro output is designated, data can be output to the apparatus for monochro image by connecting two kinds of devices for color image display and monochro image display as the output means for the output data selector 400 and then selecting the data output means by the selector 400.

In addition, the data reading system is changed, for example, depending on the output apparatus connected to the system. Namely, only the brightness information can be read in case the output apparatus for monochro image is connected. In this case, it can be realized by inputting the apparatus identifier assigned to each apparatus connected to the athe output data selector 400.

In this explanation, the three kinds of color image data $R_0'$, $G_0'$, $B_0'$ are output in parallel from the output data selector 400. If each plane is output in time series due to restriction of output device, the input data of binary image data $R_0'$, $G_0'$, $B_0'$ of three planes are sequentially output in plane by plane. In this case, output operation is the same as the parallel output described above, except for three times of input of the data to the output data selector 400.

Next, the operation principle of the BHT for display 610 will be explained. This BHT for display 610 inputs the binary image data of one plane and outputs the multivalue image data of one plane. The concrete structure will be explained hereunder.

The principle of the process for recovering the multivalue image data from the binary image data will be described first. When a person sees the artificial binary-halftone image, concentration of a certain point on the artificial binary-halftone image may be felt depending on the distributing condition of black pixels in the neighborhood thereof. Accordingly, in the case of the binary image data obtained by conducting the artificial binary-halftone process to the multivalue image data, the multivalue image data which seems to be equivalent to the original image for eyes of person can be obtained by using the distributing condition of the binary data.

In more concrete, concentration of each pixel is determined by scanning the original image with a scanning window of the particular size to detect the distributing condition of black pixels in the neighborhood of respective pixels. As an example, an example of using the scanning window of 5×5 pixels will be explained using FIG. 14.

The multivalue data $I_P$ of the center pixel (x,y) of scanning window can be obtained giving the weight to the binary data I'3P (x−2, y−2)∼I'3P(x+2, y+2) in the scanning window depending on respective position and then obtaining the sum of them. Here, the binary data I'(x,y) indicates a value on the coordinates (x,y) in the image.

The weight coefficient is determined by the distance between the sampling point A and each pixel. FIG. 15 shows an example of weight coefficient.

Accordingly, the BHT for display 610 inputs the image data for 25 pixels shown in FIG. 14 and obtains the multivalue data $I_{3P}$ by calculating product and sum of the weight coefficients shown in FIG. 15.

Therefore, calculations conducted by the BHT for display 610 are as follow.

$$Q(x,y) = \Sigma \alpha \cdot R_o'(i,y)$$

$$R_o(x,y) = \Sigma \beta \cdot Q(x,i)$$

Here, Q (x,y) is a result of product and sum for the data of 5 pixels of the coordinates (x−2, y)∼(x+2, y), while the product and sum of Q(x, y−2)∼Q (x, y+2) are equal to that of 25 pixels.

Figure 16:
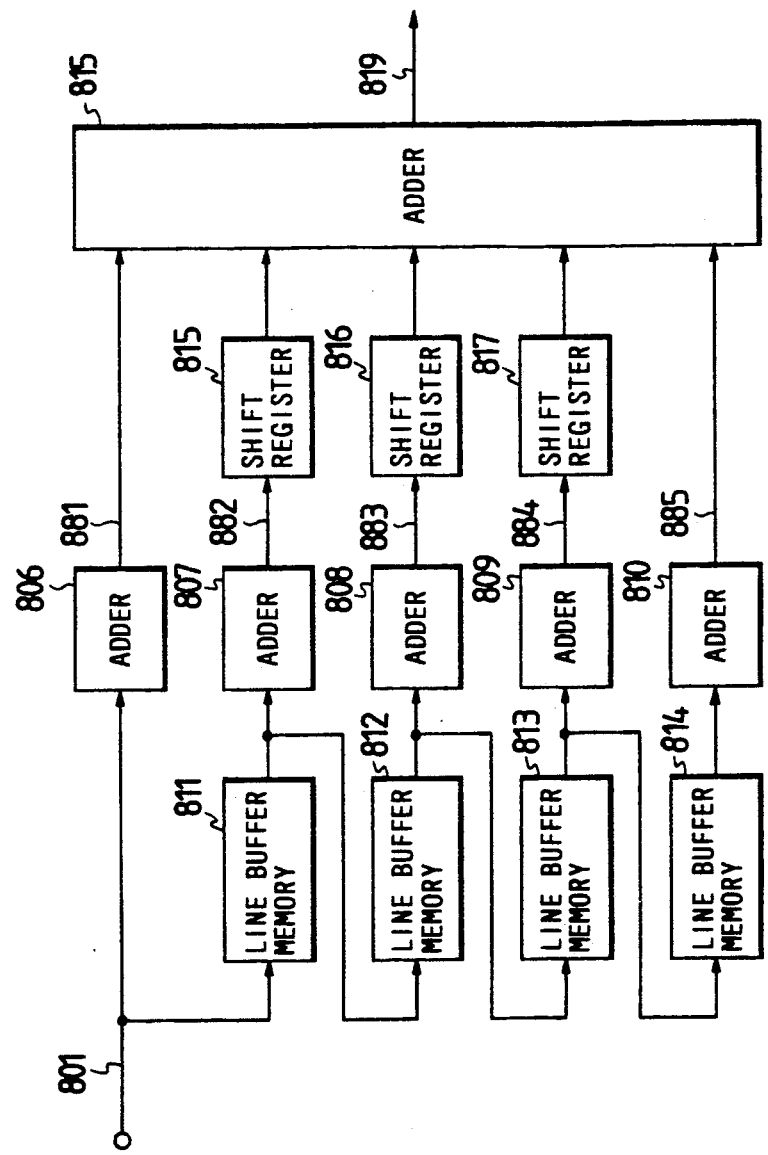
FIG. 16 is a diagram showing an example of structure of a display image transducing unit.

Next, a concrete structure will be explained. FIG. 16 is a block diagram indicating an example of the internal structure of the BHT for display 610.

In this figure, 801 designates a single output line from the output data selector 400 for inputting the binary data $R_0'$. The input binary data $R_0'$ is sent to the primary adder 806 and line memory 811.

Here, it is considered that the binary data $R_0'$ (x+3, Y+2) of the coordinates (x+3, Y+2) in the image is input. The four line memories have the function respectively as the delay unit for storing the binary data of the one scanning line. Accordingly, when the binary data $R_0'$ (x+3, Y+2) is input, the line memory 811 outputs $R_0'(x+3, Y+1)$, while the line memories 812∼814 output $R_0'(x+3, Y)$∼$R_0'(x+3, Y−2)$.

Meanwhile, the primary adder 806 is a calculator for obtaining the primary product and sum result Q.

In case the weight coefficient is equal to the value shown in FIG. 15, the weight coefficients α and β use respectively following values.

α = 1, 2, 4, 2, 1
β = 1, 2, 4, 2, 1

Accordingly, an output Q (x, y+2) of the primary adder 806 is as follow.

$$Q(x,y+2) + R_o'(x+2, Y+2) + R_o(x-2, Y+2)$$
$$+ 2X(R_o'(x+1, Y+2) + R_o(x-1, Y+2))$$
$$+ 4X(R_c'(x, Y+2)$$

Figure 17:
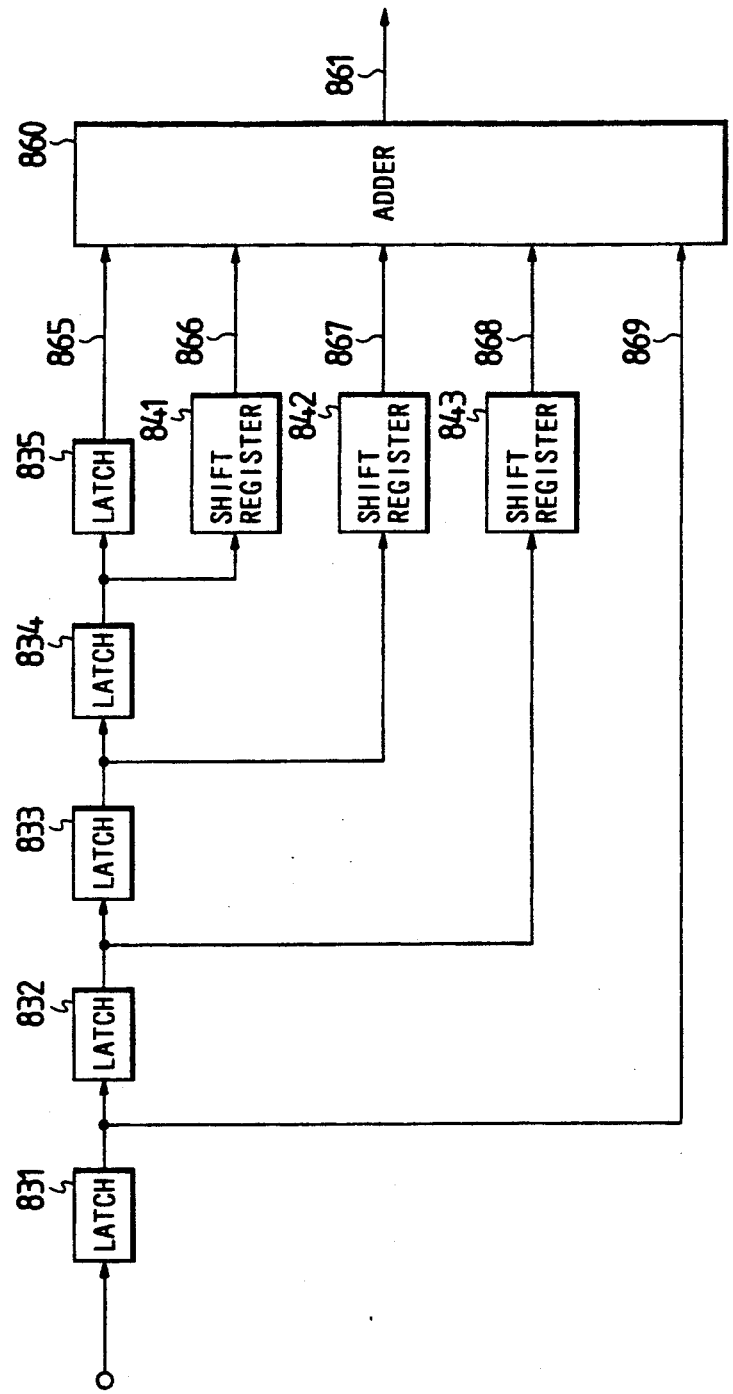
FIG. 17 is a diagram showing an example of a structure of a display image transducing unit to be used on the occasion of displaying images at a high speed.

An example of the primary adder 806 for executing this processing is shown in FIG. 17. In this figure, 831, 832, 833, 834, 835 designate latches; 841, 842, 843, shift registers; 860, adder; 861, signal line for outputting calculation result G (x, y+2).

The input value $R_0'(x+3, Y+2)$ is sequentially held in the latches 431∼435 connected in series in the form of five stages.

In this case, the holding data $R_0'(x+2, Y+2)$ $R_0'(x−2, Y+2)$ of respective latches are output from the signal lines 965∼869. The outputs of latches 831 and 835 are sent to the adder 860, while outputs of latches 832, 833, 834 are sent to the shift registers 841, 842, 843. Here, shift registers 841, 843 among three shift registers conduct the shift of 1 bit, while the shift register 842, the shift of 2 bits. As a result, $R_0'(x+2, Y+2)$, $R_0'(x'2, Y+2)$, $2 \times R_0'(x+1, Y+2)$, $2 \times R_0'(x-1, Y+2)$, $4 \times R_0'(x, Y+2)$ are input to the adder 860 and Q (x,y) is output therefrom.

In addition, this processing may also be realized using ROM. In this case, outputs from five latches are input as the address and the multivalue data Q(x,y) is output.

Figure 18:
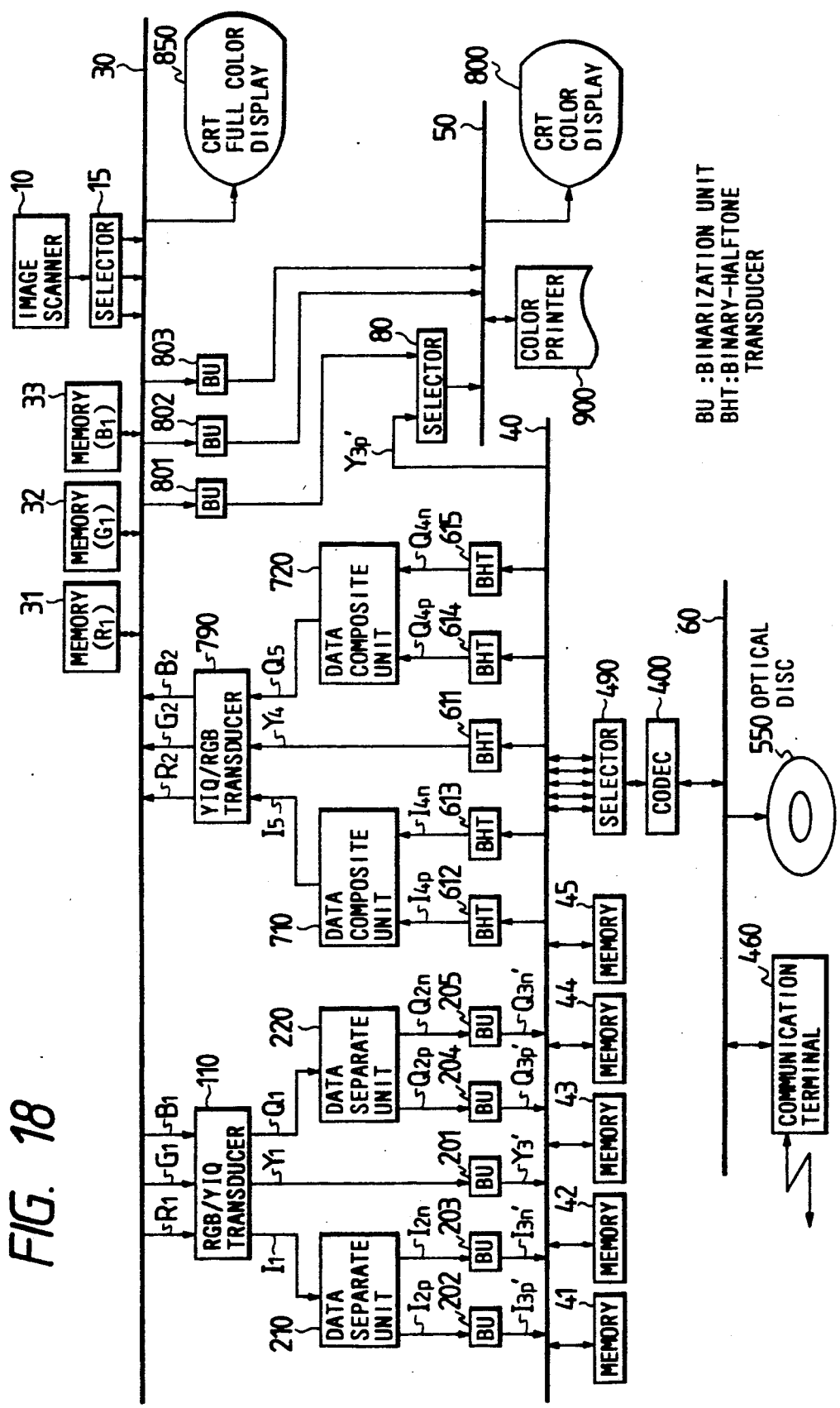
FIG. 18 is a block diagram showing an embodiment of a color document image processing apparatus of the YIQ system of the present invention.

The other primary adders 812, 813, 814, 815 in FIG. 18 are also realized in the same structure. As a result, Q (x, y+2), Q (x, y+1), Q(x, y), Q (x, y−1), Q (x, y−2) are output respectively from the signal lines 881, 882, 883, 884, 885.

The product and sum using described above are conducted for this Q. Like the primary adder, the signal lines 881, 885 connect the data to the adder 815, lines 882, 884 to the shift register 882, 884 for shift of 1 bit, and the line 883 inputs data to the shift register 816 for shift of 2 bits. As a result, G (x, Y+2), G (x, Y−2), 2×G (x, Y+1), 2×G (x, Y−1), 4×G (x, Y)

are input to the adder 815 and $R_0$ (x, y) is output therefrom.

In case a high speed display is required for display of image, the processing speed becomes sometimes insufficient in the system using the line buffers. In such a case, the high speed transducing process may be realized using the temporary adder 806 described previously.

Finally, a structure of the BHT for printer 620 will be explained. The BHT for printer 620 inputs the binary color image data and outputs the data in the format suitable to a data printer 900 such as a color printer connected to the system. In case a printer connected to the system inputs the binary color image data, BHT for printer 620 does not execute any processing. Meanwhile, in case a multivalue color image data is to be input, the BHT for printer 620 inputs the binary color image data $R_0'$, $G_0'$, $B_0'$ of three planes and outputs the multivalue color image image data $R_0$, $G_0$, $B_0$ of three planes. In this case, the operation principle of HBT for printer 620 is similar to that of the HBT for display 610 and the apparatus can also be realized by the similar structure.

By the apparatus and method explained previously, the color image processing apparatus, which effectively stores color images, particularly the image such as document including monochro domain, displays images at a high speed at the time of retrieving the contents and ensures compatibility with the conventional monochro binary image apparatus, can be realized.

In this embodiment the color/monochro identifier $F_{CM}'$ is directly stored but it is also possible to store the brightness data in addition to the R, G, B data and express $F_{CM}'$ by obtaining difference between the brightness data and G data.

Further, an embodiment of the present invention applied to the system for transducing the RGB data into the YIQ data will be explained hereunder.

FIG. 18 is an embodiment of the basic structure of the present invention.

An image data is input from the image scanner 10 as the 8 bits multivalue data of RGB. The signal line flux 30 is composed of 24 signal lines through which the 8 bits multivalue color image data of RGB pass. In this embodiment, the input R, G, B data are expressed as $R_1$, $G_1$, $B_1$, respectively.

The $R_1$, $G_1$, $B_1$ data are transduced to the brightness signal $Y_1$ and two kinds of chrominance signals $I_1$ and $Q_1$ by the RGB/YIQ transducer 110.

Next, the signals $I_1$ and $Q_1$ are set as the positive values to calculate four kinds of multivalue data $I_{2p}$, $I_{2n}$, $Q_{2p}$, $Q_{2n}$ and are then binarized by the five binarization units 201, 202, 203, 204 and 205.

The signal line flux 40 is composed of five signal lines through which the 1 bit data $Y'_3$, $I'_{3p}$, $I'_{3n}$, $Q'_{3p}$, $Q'_{3n}$ obtained by binarizing the five kinds of image data $Y_1$, $I_{2p}$, $I_{2n}$, $Q_{2p}$, $Q_{2n}$ pass. Moreover, the three kinds of 1 bit data also passes through the signal line 50, but contents are explained later in detail.

The five kinds of binary data can be stored, for example, in the optical disk 550 by encoding the data one by one with the codec 400. Here, the data obtained by encoding the data on the signal line 40 passes through the signal line 60.

Therefore, this embodiment deals with three kinds of data. The line for conducting data transducing process exists between respective signal lines and the memory for storing data is connected as required.

Next, the transducing process conducted between signal lines will be explained. The circuits indicated above the signal line 30 deals with the three kinds of multivalue image data of R, G, B. In FIG. 18, the numeral 10 designates an image scanner which reads optically a document with the known means and outputs 8 bits multivalue digital data $R_1$, $G_1$, $B_1$. 15, a selector for transferring the image data $R_1$, $G_1$, $B_1$ sent from the image scanner 10 to the adequate signal line flux. 31, 32, 33, memories for storing respective multivalue data $R_1$, $G_1$, $B_1$.

Here, it is assumed that the data $R_1$, $G_1$, $B_1$ of the single scanning line sent from the image scanner 10 are sent sequentially to the selector 15. In this case the selector 15 selects the signal line of the line flux 30 depending on the data and sends data to the memories 31, 32, 33.

The memories 31, 32, 33 store the data $R_1$, $G_1$, $B_1$. In this embodiment, since $R_1$, $G_1$, $B_1$ of the single scanning line are sequentially input in line by line, the memories 31, 32 are required to have the capacity to store at least the data of a single line or more.

Accordingly, in case the image scanner 10 scanns three times the document and outputs the data of R, G, B in the screen by screen for each output, the memories 31, 32 are required to have the capacity to store the data of at least single display screen. Moreover, in case the data of R, G, B are repetitively output for each display screen, the memories 31, 32 may be omitted. In addition, in case the R, G, B data are input from the image scanner 10 using the 24 signal lines, the selector 15 is no longer necessary.

Next, the conversion between the R, G, B data on the signal line 30 and the binary data $Y'_3$, $I'_{3p}$, $I'_{3n}$, $Q'_{3p}$, $Q'_{3n}$ on the signal line 40 will then be explained hereunder. First, flow of data and functions of respective circuits are explained and then internal structure is explained later in detail.

The input multivalue R, G, B data are input, in every pixel, to the RGB/YIQ transducer 110 and are then transduced into the three kinds of multivalue data $Y_1$, $I_1$, $Q_1$. Accordingly, in case the RGB data of the single scanning line is input in every input from the image scanner like the present embodiment, the R and G data are stored in the memories 31, 32 and when the data B is input, such R and G data of one pixel are output from the memories in every output and the RGB data of one pixel are input to the RGB/YIQ transducer 110 in each input operation.

The method of RGB/YIQ transducing for digital data is already widely known. The present invention also utilizes such typical method.

The $Y_1$, $I_1$, $Q_1$ data of output multivalue data are respectively binarized by the artificial binary-half-tone process. However, the chrominance signals I and Q can take negative value. In the artificial binary-half tone process, the signal mixing positive and negative values cannot be dealt with. Therefore, the signals I and Q are both converted to positive values.

As explained above, a value of chrominance signals becomes 0 when the monochro image is input. In case the data "0" continues after the binarization, such data provides a high encoding efficiency. Accordingly, it is necessary that conversion to positive value of chrominance signals provides an output value 0 for the input value 0 so that the data 0 continues after the binarization in case the input value 0 continues.

Therefore, in this embodiment, the signals $I_1$ and $Q_1$ are separated respectively into a couple of images consisting only of the positive value and negative value. Such separation is executed by the data separate units 210, 220.

Here, the data $I_{2n}$ and $Q_{2n}$ are converted to positive value by recording the absolute values of input values.

The positive multivalue data $I_{2p}$, $I_{2n}$, $Y_2$, $Q_{2p}$, $Q_{2n}$ are respectively binarized in the binarization units 201, 202, 203, 204, 205 and are then stored in the memories 41, 42, 43, 44, 45 through the signal line flux 40 as the binary image data I'$_{3p}$, I'$_{3n}$, Y'$_3$, Q'$_{3p}$, Q'$_{3n}$.

With such a series of structure, the multivalue RGB data may be processed as the five sheets of binary image data.

When an image is, for example, stored, in the optical disk or transferred using the FAX line, the data obtained by encoding these five sheets of binary image is used. In concrete, the five kinds of binary image data existing on the signal line flux 40 are selected sheet by sheet by the selector 490 and are then input to the codec 400. The codec 400 encodes the input binary image data sheet by sheet, for example, by the known coding system such as MH, NR, MMR systems and then outputs data to the signal line 60. As a result, the encoded data to be recorded on the optical disk becomes equal in the format to the monochro binary image data.

With the system explained the color image data expressed by the multivalue image data of RGB can be encoded and processed in the same format as the five sheets of monochro binary image data.

On the other hand, the encoded data stored in the optical disk, for example, can be output by the following procedures. The signs of the five sheets of binary image data encoded by the system described above are recorded on the optical disk. These data are read sheet by sheet and are encoded by the codec 400 to obtain the five kinds of binary image data I'$_{3p}$, I'$_{3n}$, Y'$_3$, Q'$_{3p}$, Q'$_{3n}$ and are then stored sequentially in the memories 41, 42, 43, 44, 45. This binary YIQ signal generates multivalue RGB signal.

First, the five kinds of binary data I'$_{3p}$, I'$_{3n}$, Y'$_3$, Q'$_{3p}$, Q'$_{3n}$ stored in the memories 41, 42, 43, 44, 45 are respectively transferred to the five binary-halftone transducers 611, 612, 613, 614, 615 through the signal line flux 30 and are transduced into the five kinds of multivalue data I$_{4p}$, I$_{4n}$, Y$_4$, Q$_{4p}$, Q$_{4n}$. This transducing means will be explained later in detail.

Next, the data composite units 710, 720 calculate the multivalue data I$_5$, Y$_4$, Q$_5$ including positive and negative values from the positive multivalue data of five sheets after the transducing.

The YIQ/RGB transducer 790 transduces the multi value data I$_5$, Y$_4$, Q$_5$ by the known means and outputs multivalue data R$_2$, G$_2$, B$_2$.

In above system, the multivalue image data RGB can be obtained from the stored encoded data. Next, means for displaying and outputting such image data will be explained.

First, in case the data is to be displayed on a full color display 850, the three multivalue data RGB on the signal line 30 are displayed in direct. Meanwhile, in case the output apparatus corresponds to the binary color image, the RGB signals are respectively binarized by the artifical binary-halftone process in the binarization units 800, 801, 802. The binarized three image data are transferred and output to the color printer 900 and color CRT 800.

Meanwhile, for the retrieval of many images, it is requested to display contents of respective images at a high speed. In the present invention, the image data Y'$_3$ obtained by binarizing the brightness signal Y is already stored in the optical disk. This image data Y'$_3$ expresses the original image by the monochro artificial binary-halftone image.

Therefore, in case an image in the optical image 550 is to be displayed at a high speed, only the brightness information Y$_b$ among the five encoded data is read first and the it is encoded in the codec 400. The encoded output is then input to the selector 80 by the signal line 40. The selector 80 selects the one of the operations (a), (b) described hereunder and executes such operation depending on the command issued from the external circuits.

(a) The data obtained by binarizing the multivalue data R input from the binarizing unit 800 by the binary-halftone process is transferred to the signal line for signal R of the signal line 50.

(b) The image data input from the signal line for signal Y of the signal line 40 is transferred respectively to the lines for R, G, B of the signal line 50.

Here, when the selector 80 conducts the operation (b) mentioned above, the monochro image can be displayed on the color CRT 800 in such a timing that the one image signal of five signals required to form a color image is input.

Moreover, the monochro image system is capable of displaying/outputting the brightness data Y'$_3$ as the monochro image because the processing (b) mentioned above is conducted without any conditions.

Next, an example of the internal structure of circuits explained above will then be described in detail. First, the RGB/YIQ transducer 110 will be explained. This circuit has the function to input the 8 bits data of R$_1$, G$_1$, B$_1$ for each pixel, execute the matrix conversion and output three multivalue data Y$_1$, I$_1$, Q$_1$ of the relevant pixel. As the RGB/YIQ transducing for digital data, various prior arts are proposed and the present invention also applies such prior art.

Next, the internal structure of the data separate units 210, 220 for setting the data I$_1$, Q$_1$ including the positive and negative values to the positive value will be explained. These two data separates units have the same structure.

Figure 19:
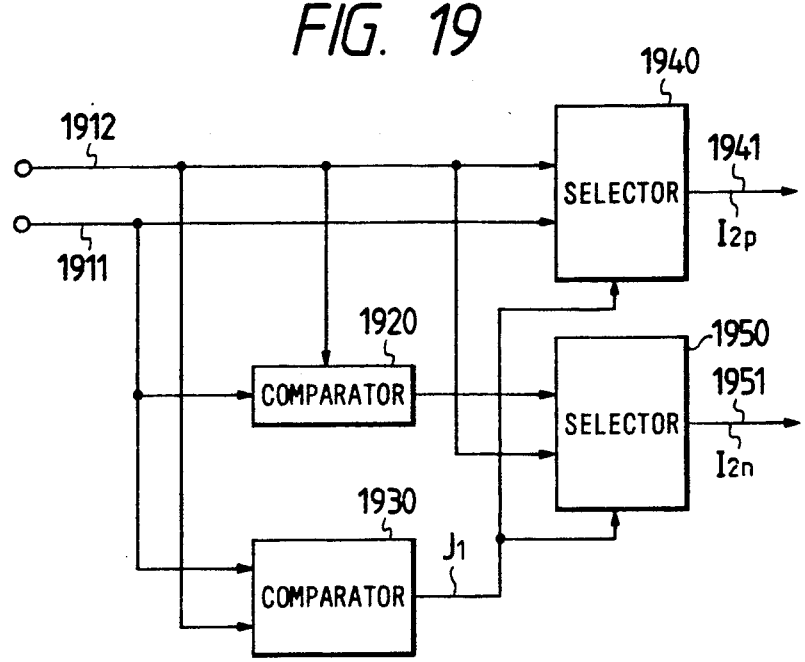
FIG. 19 is a block diagram showing an example of internal structure of a positive and negative data separate unit.

FIG. 19 is a diagram indicating an internal structure of the data separate unit 210. In this figure, the numeral 1911 designates a signal line to input the chrominance signal I$_1$ from the RGB/YIQ transducer 110; 1912, a signal line to input the value 0 as the criterion of discrimination; 1920, a differentiator for outputting an absolute value when an input value is negative; 1930, a comparator for discriminating the sign of input value; 1940 and 1950 are selectors which selectively output the one of two inputs by the output of comparator. Moreover, the signal line 1941 is an output line of selector 1940 and outputs the multivalue data I$_{2p}$, while the signal line 1951 is an output line of selector 1950 and outputs the multivalue data I$_{2n}$.

First, when an input value I is positive, the comparator 1930 outputs "1" as the signal J$_1$, or when an input value I is negative, it outputs "0" as the signal J$_1$. With an output of the comparator, the two selector outputs I$_p$, I$_n$ are determined by the following formulae.

$$I_{2p} = \begin{cases} I_1 : J_1 = 1 \\ 0 : J_1 = 0 \end{cases}$$

$$I_{2n} = \begin{cases} 0 : J_1 = 1 \\ -I_1 : J_1 = 0 \end{cases}$$

As a result, the multivalue data I$_{2p}$ and I$_{2n}$ take 0 or positive value.

Another data separate unit 220 in FIG. 1 employs also the same structure. Accordingly, the output values $Q_{2p}$ and $Q_{2n}$ of the data separate unit 220 also take 0 or positive value.

The structure and operations of five binarization units 201~205 shown in FIG. 18 are same as those of the binarmization unit explained in the embodiment of the RGB system.

With the structure described above, five binary image data $I'_{3p}$, $I'_{3n}$, $Y'_3$, $Q'_{3p}$, $Q'_{3n}$ are calculated from the multivalue color image data $R_1$, $G_1$, $B_1$ and are output to the signal line 30. The output image data are stored in the memories 41, 42, 43, 44 45 connected to the signal line flux 30.

In case the image data is to be stored in the optical disk, the signals may be dealt with in the same way as storing the five monochro binary image. The selector 490 sequentially selects a single line from the signal line flux 30 and transfers five binary image data sheet by sheet to the codec 400. This codec 400 may be realized in the same structure as that used for the RGB system shown in FIG. 4. The encoded data is stored in the optical disk 550 through the signal line 60. Moreover, it is also possible, like the RGB system, to transfer the encoded data to the external circuit by connecting a communication terminal 570 to the signal line 50. In a general apparatus utilizing the MH code or MMR code, when the data "0" continues on the scanning line, the encoded data quantity may be minimized. For this reason, the data quantity of encoded monochro domain in the input image can be minimized since the chrominance signal becomes 0. Therefore, when the image including the color image and monochro image is dealt with, a high enocoding efficiency may be attained since data quantity of chrominance signal of the monochro domain is almost zero.

Next, the structures of respective circuits for calculating multivalue RGB data from the binary image data $I'_p$, $I'_n$, $Y'$, $Q'_p$, $Q'_n$ stored in the five memories 41, 42, 43, 44, 45 will be explained.

The five binary-halftone transducers 611, 612, 613, 614, 615 used to calculate multivalue data $I_{4p}$, $I_{4n}$, $Y_4$, $Q_{4p}$, $Q_{4n}$ from the binary image data $I'_{3p}$, $I'_{3n}$, $Y'_3$, $Q'_{3p}$, $Q'_{3n}$ have the same structure as those used in the RGB system shown in FIG. 17. The five binary-halftone transducers 611, 612, 613, 614, 615 outputs five multi-value data $I_{4p}$, $I_{4n}$, $Y_4$, $Q_{4p}$, $Q_{4n}$ by executing the transducing process to five binary image data.

The data $I_{4p}$ and $I_{4n}$, $Q_{4p}$ and $Q_{4n}$ among the multi value data are in such a relation that these are separated from a sheet of image signal including the positive and negative signals and the sign of the other is inverted.

Therefore, the signal $I_{4p}$ and $I_{4n}$ are added in the data composite unit 710, while $Q_{4p}$ and $Q_{4n}$ in the unit 720, respectively to calculate $I_5$ and $Q_5$.

Here, the data composite units 710 and 720 conduct the calculations in accordance with the following formulae.

$$I_5 = I_{4p} - I_{4n}$$

$$Q_5 = Q_{4p} - Q_{4n}$$

These two data composite units may be realized in the same structure.

With the structure described above, the multi value data can be calculated. The YIQ/RGB transducer 790 inputs these signals $I_5$, $Y_4$, $Q_5$ and outputs multivalue color image data $R_2$, $G_2$, $B_2$.

This YIQ/RGB transducer 790 uses the known YIQ/RGB transducer. In some cases, the range which the signals $I_8$, $Y_8$, $Q_8$ can take is different from the range of output data of the RGB/YIQ transducer 110 depending on the weight coefficient of the binary-halftone transducer. In such a case, these ranges are matched by multiplying a constant value to a value of the coefficient matrix in the YIQ/RGB transducer 790. Next, the output part of color image is explained again with reference to FIG. 18. The output part of the present invention is provided with a means for outputting monochro image at a high speed in such a case of searching content of image stored in the optical disk.

The multicolor image data R, G, B are input to three binarization units 801, 802, 803 by the memories 31, 32, 33 or YIQ/RGB transducer 710 through the signal line flux 40. Here, the binarization units 801, 802, 803 binarizes respective data R, G, B. The internal circuit structures of the binarization units 801, 802, 803 may be formed, for example, same as that of the binarization unit 200 described previously.

Result of binarization is output, for example, to bit map memory of color CRT or color laser beam printer through the selector 90. The single signal line of the signal line flux 40 is connected to the selector in addition to the R, G, B data lines and the binarization result $Y_3^2$ of brightness data is input thereto.

This selector 90 outputs the binarization result of R, G, B data for output of the color image, for example, in accordance with the command from external circuit or outputs $Y_3'$ for output of monochro image.

In addition, when the monochro output is designated, data can be output to the monochro image apparatus by selecting the output apparatus with the selector. Moreover, the data reading system can also be changed depending on the output apparatus connected to the system. Namely, in case a monochro output apparatus is connected, only the brightness information is read.

Further, as explained previously, when it is requested to search contents of image data stored in the optical disk, only the brightness information may be read by executing the reading operation in every other five images stored on the optical disk. When the monochro display is designated, the monochro image may be displayed on the color CRT only by reading a sheet of image among five images through direct display of the brightness data in the signal line flux 50 as the RGB data of the color CRT 800. In this case, since the binary-halftone transducing and YIQ/RGB transducing are unnecessary, the display speed same as the output of monochro binary image can be attained.

Figure 20:
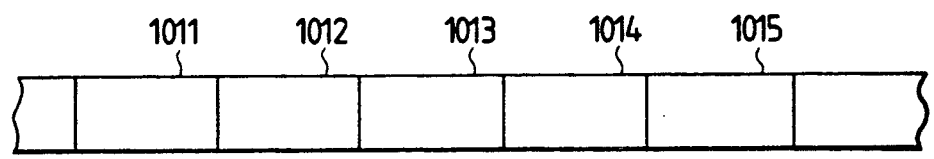
FIG. 20 is a diagram showing an example of the recording format of optical disk.
Figure 20:
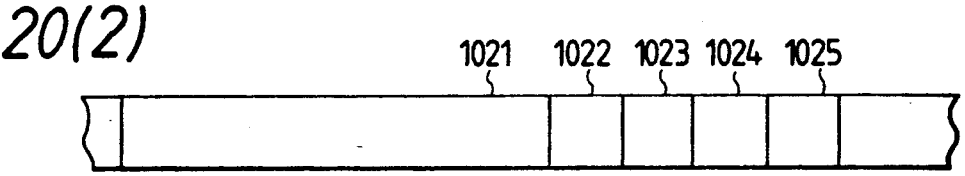
Figure 20:
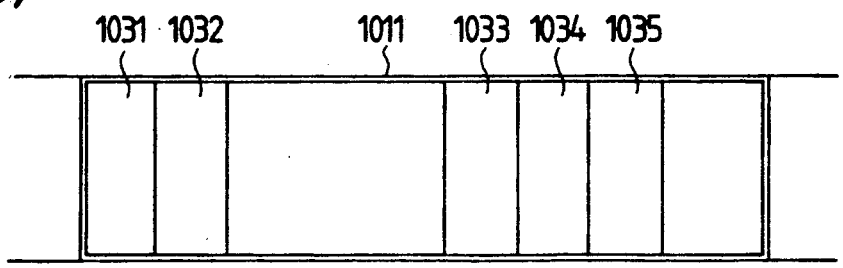

For realization of high speed monochro output, the recording format of image data in the optical disk must be the format ensuring effective read operation of brightness data. An example of the recording format in the optical disk is shown in FIG. 20. In FIG. 20(1), the rectangulars 1011~1015 indicate the domains for entering the directories of a sheet of binary image, while the rectangulars 1021~1025 of FIG. 20(2) indicate the domains for entering the binary image data of a sheet of binary image.

In the case of this embodiment, a sheet of color image data is recorded in the optical disk as the five sheets of binary image data. In this case, the directory of five sheets of image data is also recorded in the optical disk. Here, both image data and directory of brightness data are entered first, followed by those of four sheets of chrominance signals.

A part of format of directory 1011 is shown in FIG. 20(3). This format is the same as the 1012~1015. In this figure, 1031 is a column for entering peculiar number as the binary image; 1032, for entering a pointer showing the position of the next binary image; 1033, for entering peculiar number of each color image; 1034, for entering a pointer showing the position of the next brightness data. Accordingly, content of 1034 shows position of the binary image data after five sheets of images. Moreover, 1035 is a column for entering a flag showing brightness data or chrominance data of the image data. Hereinafter, this flag is called a brightness flag.

In the case of color display in reading of data, five sheets of color image data of which peculiar number matches the designated number are sequentially read and are stored also in the memories 41~45 shown in FIG. 18. Meanwhile, in case the monochro display is designated, the directory of color image of which peculiar number matches the designated number is read and only the data of which brightness flag is "ON" is read and is then transferred to the display from the selector 80.

With such structure, an image processing apparatus which effectively store color image data and outputs monochro output in addition to color image can be realized.

Figure 21:
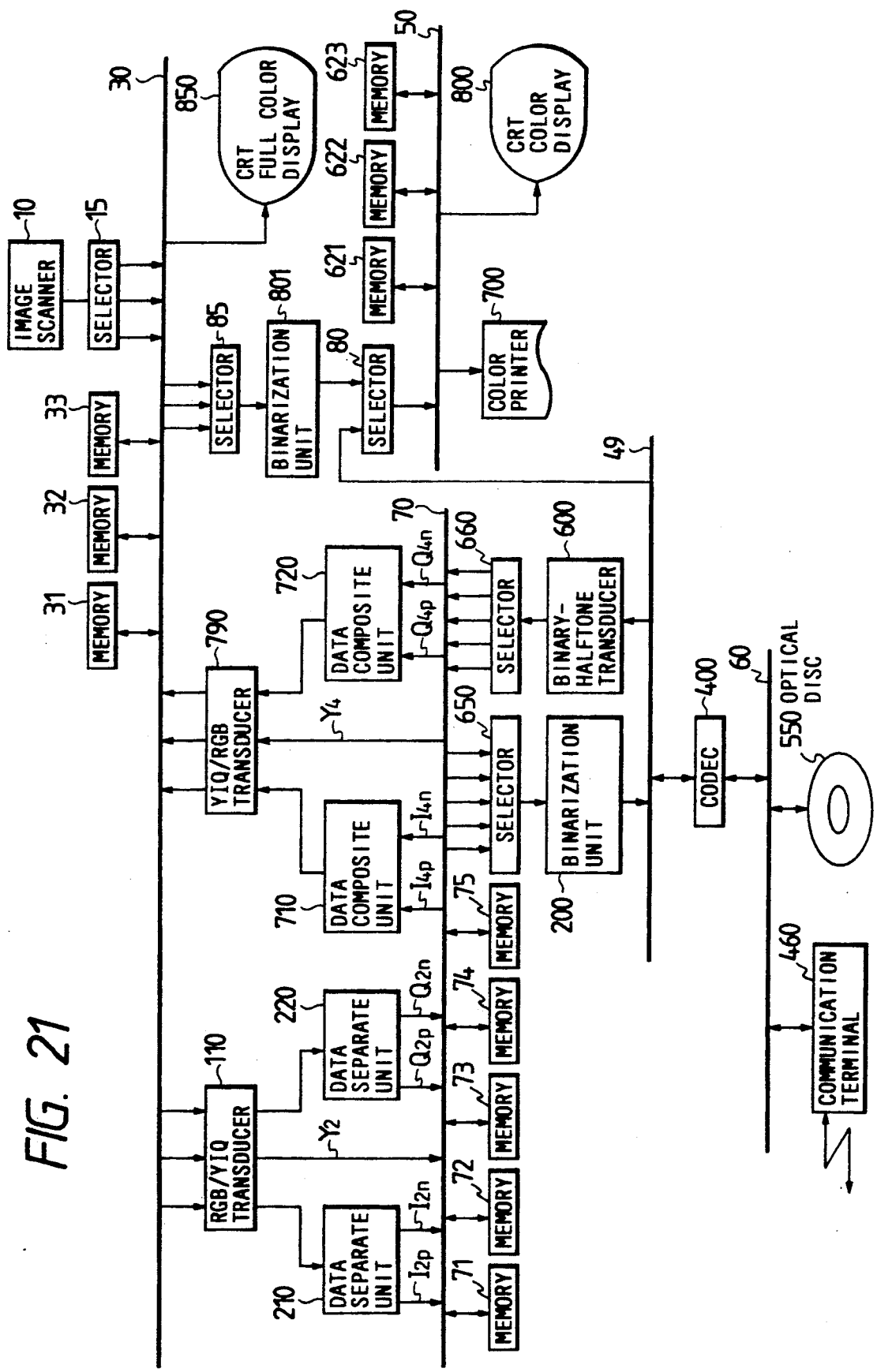
FIG. 21 is a block diagram explaining another embodiment of the present invention.

It is a first object of the apparatus described above to process at a high speed the RGB and YIQ data. However, this system requires many binarization units and binary-halftone transducers. But this system is also capable of temporarily storing data in the memory to execute on time series the conversion of data. A block diagram of a structure of such system is shown in FIG. 21.

The like circuits as those in FIG. 18 are designated by the like reference numerals. The input multivalue RGB data is transduced into the multivalue YIQ data by the RGB/YIQ transducer 110. Thereafter, Y is stored in direct, while the I and Q is subjected to data separation by the data separate units 210, 220 and are then stored, through the signal line flux 70, to the memoroes 71, 72, 73, 74, 75, respectively. These memories 71~75 store the multivalue image data. The data stored in the image memories 71~75 is selected by the selector 650 sheet by sheet and is then input to the binarization unit 200 for binarization. The binarized data is encoded by the codec 400 like the case described above and stored in the optical disk through the signal line 49.

Moreover, for the storage or calculation of multivalue RGB data from the binary image data input by the communication terminal 460 from external circuit, processing is carried out in the following sequence.

The binary image is read in the sequence of $Y'_3$, $I'_{3p}$, $I'_{3n}$, $Q'_{3p}$, $Q'_{3n}$ from the optical disk nd are decoded sequentially by the codec 400. The decoded binary image data is transduced to multivalue data by the binary-halftone transducer 600 and are sequentially written in the memories 71~75 by the selector 660 thorugh the signal line flux 60.

After four signals among five signals $Y_4$, $I_{4p}$, $I_{4n}$, $Q_{4p}$, $Q_{4n}$ are entered to the memory, the last data $Q_{4n}$ is output and simultaneously four data of memory are also output to the data composite units 710, 720 and YIQ/RGB transducer 790.

Meanwhile, the output system of multivalue RGB data can also be formed as explained hereunder. The multivalue data is selected one by one by the selector 85 from three multivalue data in the signal line flux 30 and are input to the binarization unit 801. After the binarization, data is recorded sequentially to the binary image memories 621, 622, 623 through the selector 80. Here, the memories 621, 622, 623 record respectively the R, G, B data.

On the other hand, in the case of monochro output, the selector 80 outputs the binary image data $Y'_3$ transferred from the signal line 39 and simultaneously writes $Y'_3$ to three memories 621, 622, 623.

According to the structure mentioned above, the binarization unit and binary-halftone transducer may be eliminated from the structure described previously without lowering the processing rate of monochro output.

Thereafter, a means for further enhancing the function of the present invention will be explained.

First, a means for improving the encoding efficiency will be explained. In this embodiment, the structure for obtaining the brightness signal Y and chrominance signals I and Q in the same resolution has been explained. However, as explained previously, the sense of sight of a person is low in the resolution for chrominance in comparison with that for brightness. Therefore, it is effective, as an embodiment, to execute the processing for the signals I, Q by extracting the processing to ½ for both in the main scanning line direction and subscanning line direction. As the method for reducing the processing to ½, it is possible to use the known method because there is no particular restriction. In this case, the capacity of the memories (41, 42, 43, 44, 45 in FIG. 18; 71, 72, 73, 74, 75 in FIG. 21) for the signals I, Q can be reduced to ¼ from that mentioned above.

Second, a means for improving image quality of binary image for the document mixing color/monochro domains and character/photo domains will then be explained.

The present invention stores the YIQ signals by binarization. As the binarization method, this embodiment considers an example of the binarization unit (201 in FIG. 18) which can select the following processings from the command issued from the external circuit.

(a) Binarization by the fixed threshold value (b) Artificial binary-halftone process by the organic dither technique (c) Artificial binary-halftone process by the average error minizing method Therefore, selection of binarization method is conducted depending content of image in order to improve image quality and encoding efficiency. A means for realizing this function will be explained with reference to FIG. 22.

Figure 22:
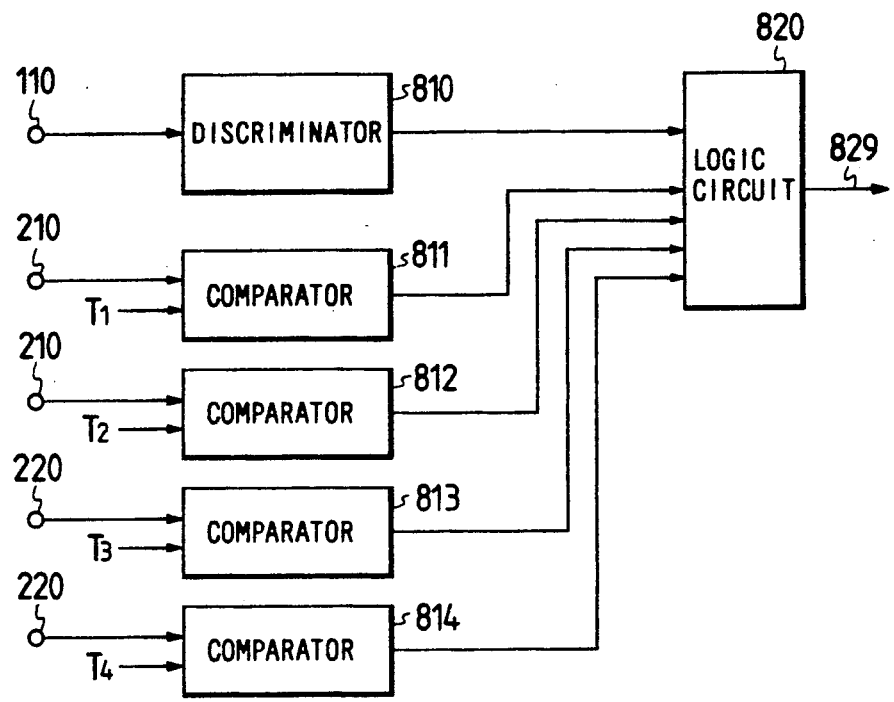
FIG. 22 is a structural diagram for realizing automatic selection of the binarization processing method.

In FIG. 22, the numeral 810 designates a domain discriminator; 811, 812, 823, 814, a comparator; 820, logic gate; 829, signal line to binarization unit 201.

The domain discriminator 810 inputs the multivalue brightness data $Y_1$ from the RGB/YIQ transducer 110 and discriminates, by the known means, whether the binarization by the fixed threshold value or by the artificial binary-halftone process should be done for each part of input image.

In the present invention, a multivalue brightness information is used. Therefore, in the case of binarizing the image such as a document, various means, used to execute the binary-halftone process to the halftone domain such as a photograph and the binarization by fixed threshold value for line and figure such as a character, can be employed.

Meanwhile, 811, 812, 813, 814 designate comparators for comparing the input multivalue chrominance data $I_{2p}$, $I_{2n}$, $Q_{2p}$, $Q_{2n}$ with the preset threshold values $T_1$, $T_2$, $T_3$, $T_4$.

In the monochro domain of input image, the chrominance signals $I_{2p}$, $I_{2n}$, $Q_{2p}$, $Q_{2n}$ take a value near 0 but observation in unit of pixel proves that it does not always become 0 accurately. Accordingly, in case four kinds of multivalue data are less than the particular threshold value, these data can be considered as the monochro image. As an example, operations of comparator 811 are expressed by the following formulae.

$$S_11: I_{2p} \geq T_1$$

$$0: I_{2p} < T_1$$

The logic circuit 820 outputs the final discrimination result by the outputs of four comparators 811, 812, 813, 814 and domain discriminator 810 explained above. When outputs of four comparators are "0" and an output of domain discriminator 810 is "diagram", the image being input is a monochro diagram. Accordingly, the binarization process by the fixed threshold value may be conducted for monochro diagram, while the artificial binary-halftone process by the average error minimization method for color diagram and the artificial binary-halftone process by the organic dither method for the halftone domain. Moreover, it is also possible to select the binarization system not only by executing discrimination to each part of a sheet of image but also executing discrimination to every sheet of image.

Third, compatibility with the apparatus for the monochro binary image will be explained. For example, an electronic file has been intended conventionally to the monochro binary image. Described hereunder is the case of outputting, by the present apparatus, image which has been input and stored. The image data which has been input by the conventional apparatus intended to the monochro image is a binary image of the brightness information. The present invention provides a means for directly outputting the binary image of brightness information stored in the optical disk. Therefore, an image which has been input by the conventional monochro image apparatus can be output by the following method.

Figure 23:
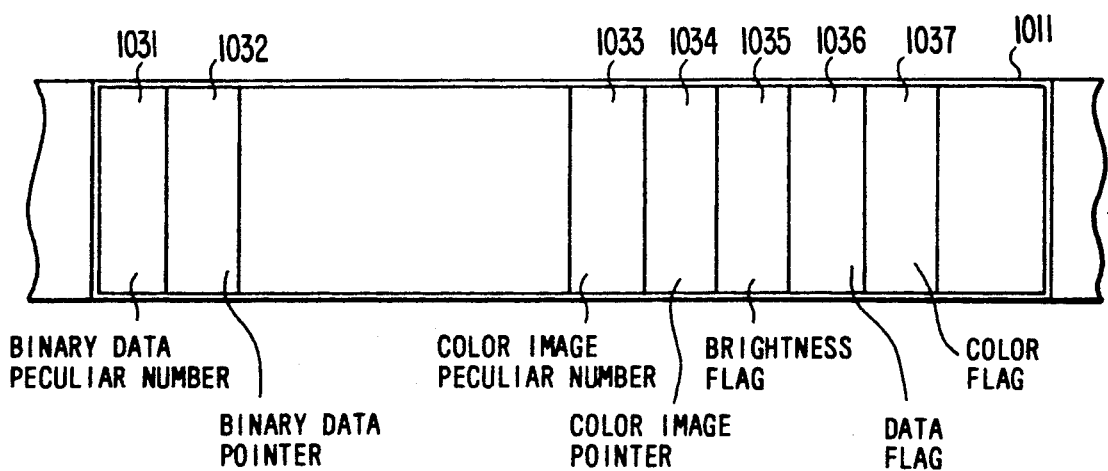
FIG. 23 is a diagram showing an example of color image data recording format for maintaining compatibility with an image processing apparatus for monochro image.

An example of the internal format of the directory 1011 is shown in FIG. 23. This figure indicates the directory of the binary image data for brightness signal as in the case of FIG. 20 and is similar to the directory of image data for chrominance signal. Here, the column 1031 for entering peculiar number as the binary image, the column 1032 for entering the pointer which indicates position of the binary image and the column 1040 for entering each item as the binary monochro image have the same format as the directory format in the conventional monochro apparatus. As a result, the image data recorded in the optical disk by the apparatus of the present invention can be retrieved and output by the conventional monochro apparatus.

In the case of entering data with the apparatus of the present invention, the peculiar number of each color image is entered to the column 1033 and the pointer address indicating position of the next brightness data to the column 1034, in addition to respective items mentioned above. Even in case a monochro image is input, a novel peculiar number of color image is given and the next data position is entered to the column 1034. Moreover, content of flag indicating which data among five data $I_p$, $I_n$, Y, $Q_p$, $Q_n$ corresponds is entered to the column 1036. This flag is called a data flag. In case the data is brightness signal or monochro image, nothing is entered to the column 1036. As a result, the data entered by the conventional monochro apparatus can also be output on the apparatus of the present invention as the monochro image. Further a flag indicating color image or monochro image of the input data is entered to the column 1037. Thereafter, this flag is called a color flag.

When it is designated that an image is displayed in color, the apparatus first reads the directory of optical disk and then retrieves the image to be designated for display by the peculiar number of color image entered to the column 1033. As a result of retrieval, five data data are selected for a sheet of color image. Next, when color image is confirmed by checking the color flag, the selector 490 is driven in accordance with content or entering sequence of column 1036 and it transfers such five data to the memory.

Meanwhile, in case the image designated for output is a monochro image, the monochro image can be detected by the color flag. In this case, the monochro image is output in direct through the process same as the high speed display process.

Finally, as an application example of the present invention, the apparatus and system which input a document as a digital image data and store the brightness signal and chrominance signal will then be explained.

Figure 24:
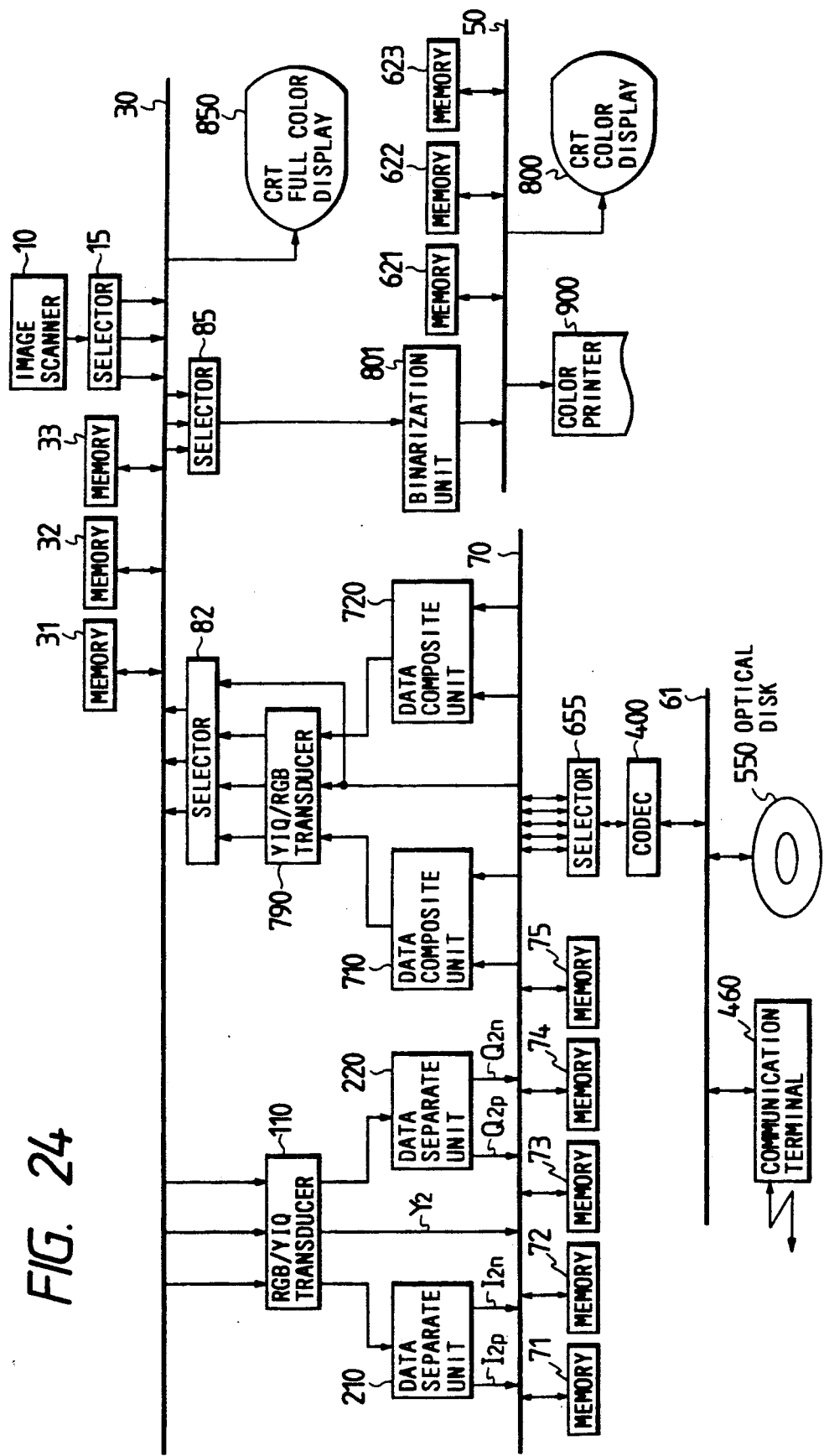
FIG. 24 is a diagram showing a structural example of a color document image processing apparatus which processes the binary-halftone data after conversion to the luminousness/chrominance signal as the other embodiment of the present invention.

FIG. 24 is a block diagram of such application example of the present invention. The circuits like those in FIG. 18 and FIG. 21 are indicated by like reference numerals. In this figure, the selector provides a function to select the one of the RGB data input from the YIQ/RGB transducer 790 and the brightness signal Y input from the one line of the signal line flux 70. This selector 82 can also be applied to the embodiment of FIG. 18 and FIG. 21 and provides similar effect.

The process from input of a document as the digital data of three primary colors of R, G, B to storage of them as the YIQ signal after conversion to the memories 71~75 is the same as the embodiment shown in FIG. 21. Here, the selector 655 has a function to input and output in both ways. During the data storage, only one line of signal line flux 70 is selected and the brightness/chrominance signals $Y_2$, $I_{2p}$, $I_{2n}$, $Q_{2p}$, $Q_{2n}$ input from the memories 71~75 are sequentially transferred to the codec 400.

Meanwhile, during readout operation of image, the signals stored as the multivalue image data of five sheets on the optical disk 550 are sequentially read and then stored in the memories 71~75 through the decoding operation. The successive operations are basically the same as those explained with reference to FIG. 21.

Here, the selector 82 selects the RGB signal output from the YIQ/RGB transducer 790 or the brightness signal Y passing through the signal line flux 70 and then transfers it to the signal line flux 30. Here, when the brightness signal Y is selected, the R, G, B images of signal line flux 30 become the monochro image with the brightness signal Y.

Figure 25:
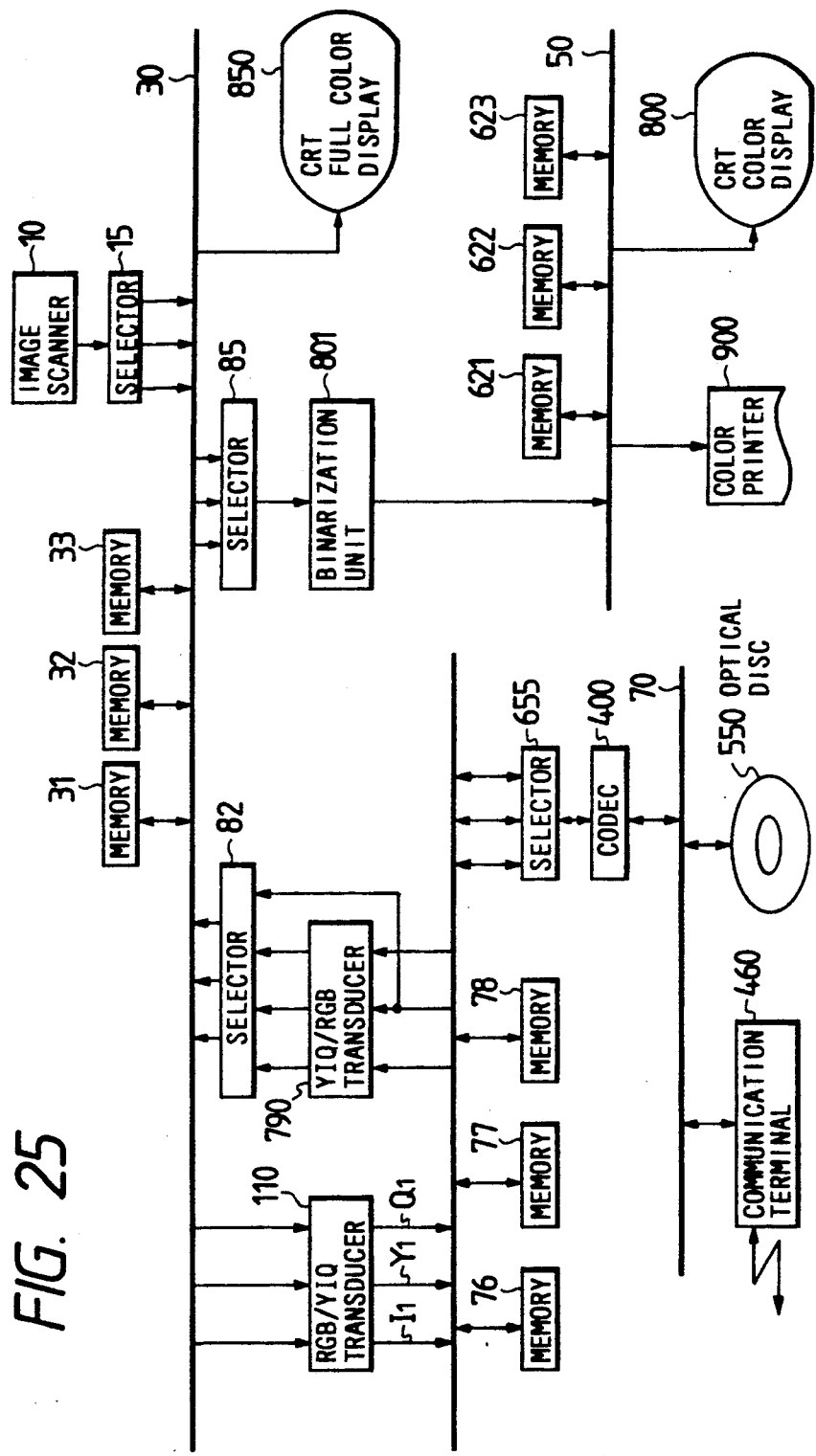
FIG. 25 is a diagram showing a structural example of a color document image processing apparatus processing the binary-halftone data mixing the positive and negative values after conversion to luninousness/chrominance signal as the other embodiment of the present invention.

Moreover, in case the system intended to the data mixing the positive and negative values is used as the encoding system for multivalue data, the data separate process and composite process may be avoided. FIG. 25 shows an embodiment of the apparatus for encoding the chrominance signal including the positive and negative signs.

In this figure, the brightness/chrominance signals $Y_1$, $I_1$, $Q_1$ are stored in the memories 76, 77, 78. The operations of other circuits are similar to those in FIG. 24.

Finally, an embodiment of the image processing system proposed by the present invention will be explained. This system is capable of effectively processing the color image including monochro image by executing the process similar to the operation of the image processing apparatus explained above to the color image data.

As described heretofore, the present invention realizes a color image processing apparatus which provides a function to effectively store images mixing the monochro domain such as a document and thin patterns such as character, displays at a high speed a monochro image during retrieval of content and moreover ensures compatibility with the conventional monochro binary image.

What is claimed is:

1. A color document image processing apparatus which processes document image data including color images as digital data, comprising:
   an image scanner for inputting a document image data including multivalue color images;
   binarization units for binarizing an input document image data by the simple binarization process or artifical binary-halftone process;
   memory means for temporarily storing image data binarized by said binarization units;
   codecs for executing designated encoding for the image data recorded in said image memories and decoding for the stored document image data;
   an image storage for storing document image data encoded by said codec;
   binary-halftone transducers for transducing binary image data encoded by said codecs into multivalue image data; and
   image output means for outputting multivalue image data transduced by said binary-halftone transducers.

2. A color document image processing apparatus according to claim 1, further comprising a means for designating simple binarization process or binary-halftone process of said binarization units in accordance with an input document image.

3. A color document image processing apparatus according to claim 1, wherein said binary-halftone transducer comprises a binary-halftone transducer for display to display the data on a display and a binary-halftone transducer for printer to print the data on a printer.

4. A color document image processing apparatus according to claim 1, wherein said image scanner inputs image data as RGB data.

5. A color document image processing apparatus according to claim 4, wherein said image memories store RGB data in independent three sheets of planes.

6. A color document image processing apparatus according to claim 4, further comprising an RGB/YIQ transducer for transducing RGB data input by said image scanner into YIQ data.

7. A color document image processing apparatus according to claim 1, comprising a means for discriminating each part of said input image whether it is monochro image or color image and a means for recording discrimination result as binary data of each pixel.

8. A color document image processing apparatus according to claim 1, comprising a means for designating following four modes depending on the object image and changing the data transfer route in accordance with the designated mode,
   mode 1: only G data among RGB data is selected and stored;
   mode 2: each multivalue data of RGB is independently binarized by the artificial binary-halftone process and three binary image data as the result of said binarization are stored;
   mode 3: each image data of object RGB image data is discriminated for monochro domain or color domain, only G data is stored for monochro domain and R and B data are set to 0, each pixel is quantized to the particular single or double colors for color domain and other color data is set to 0;
   mode 4: the multivalue data of RGB are independently binarized by the artificial binary-halftone process, each image data of object image is discriminated for monochro domain or color domain, and binary data as a result of discrimination is stored together with the relevant binary image data.

9. A color document image processing apparatus according to claim 1, further comprising a means for conducting a plurality kinds of binarizing processes including the artificial binary-halftone process and a means for selecting at least a kind of said plurality of binarizing processes as a means for binarizing multivalue data of RGB.

10. A color document image processing apparatus according to claim 9, further comprising a means for obtaining characteristic quantity of each part of input image, a means or discriminating domain of each part and a means for changing the binarization system depending on the result of said discrimination as the means for selecting the binarizing system.

11. A color document image processing apparatus according to claim 1, further comprising a means for executing the simple binarizing process by the fixed threshold value, a means for executing the artificial binary-halftone process, a means for changing said two processes, a means for discriminating which image each part of images to be objected belongs to in a binary image such as character and a halftone image such as photograph, and a means for discriminating whether it is monochro image or color image and for executing the simple binarizing process to only the part which is discriminated monochro and binary image, as a means for changing multivalue color image data.

12. A color document image processing apparatus according to claim 1, further comprising a means for transducing said multivalue chrominance data I and Q into multivalue signal consisting of 0 or positive value.

13. A color document image processing apparatus according to claim 12, comprising a means for inputting said chrominance signals and outputting two kinds of multivalue image data $I_p$, $I_n$ and $Q_p$, $Q_n$ through data separation as the means for transducing said multivalue chrominance signals I and Q to the multivalue signals consisting of 0 and positive value.

14. A color document image processing apparatus according to claim 1, comprising:
   a means for independently encoding said binarized brightness information Y' and chrominance data I' and Q';

a means for storing only said binarized brightness information Y' when an input image is a monochro image; and a means for storing, in other cases, said brightness information Y' and chrominance data I' and Q' and also recording that an input image is a color image.

15. A color document image processing apparatus according to claim 14, comprising:

a means for comparing values of said multivalue chrominance data I and Q with a predetermined value;

a means for discriminating that said input image is a monochro image in case a value of said chrominance signal is within a particular range at the part larger than the predetermined area of said image input as a result of said comparison;

a means for storing only said binarized brightness information Y' in case the image input as a result of said discrimination is monochro image;

a means for storing said brightness information Y' and chrominance data I' and Q' in case the image input as a result of said discrimination is not a monochro image; and a means for recording that an input image is a color image.

16. In a color document image processing apparatus for processing a document image including color images as digital data, said color document image processing apparatus comprising:

a means for binarizing an input multivalue color image data of RGB type by the artificial binary-halftone process;

a means for encoding three sheets of binarized image data;

a means for storing said encoded binary data of three sheets of plane as the other artificial binary-halftone image;

a means for reading said stored binary data of three sheets of planes;

a means for decoding said binary data of three sheets of planes read from the memories;

a means for transducing said decoded binary data into multivalue data of three sheets of planes; and a means for displaying transduced multivalue data of three sheets of planes as RGB image data.

17. In a color document image processing apparatus for processing a document image including color images as digital data, said color document image processing apparatus comprising:

a means for transducing an input RGB multivalue color image data into a multivalue brightness information and a plurality of multivalue chrominance data I and Q;

a means for binarizing said brightness information Y and said chrominance data I and Q by the artificial binary-halftone process;

a means for encoding said binarized brightness information Y' and chrominance data I' and Q' as an artificial binary-halftone image;

a means for storing said encoded brightness information and chrominance data as different artificial binary-halftone image data;

a means for reading said stored brightness information and chrominance data;

a means for decoding said readout brightness information and chrominance data;

a means for inputting said decoded binary brightness information Y' and chrominance data I' and Q' and then outputting multivalue brightness information Y'' and chrominance data I'' and Q''; and a means for displaying only said decoded binary brightness information Y' as an artificial binary-halftone image.

18. A color document image processing apparatus according to claim 17, comprising a means for obtaining chrominance data in the resolution different from that of said brightness information.

19. A color document image processing method comprising:

a system, as the system for storing or transmitting document images including color images as digital data, for inputting an RGB multivalue color image data and transducing said color image data into multivalue brightness data Y and multivalue chrominance data I, Q, binarizing said brightness information Y and chrominance data I, Q by the artificial binary-halftone process, encoding said binarized brightness information Y' and chrominance data I', Q' as an artificial binary-halftone image and storing said encoded brightness information and chrominance data as individual artificial binary-halftone images;

a method for reading said stored brightness information and chrominance data, decoding said readout brightness information and chrominance data and outputting multivalue brightness information Y'' and chrominance data I'' and Q'' by executing the calculation process to said decoded binary brightness information Y' and chrominance data i' and Q'; and a method for displaying only said decoded binary brightness information Y' as an artificial binary-halftone image.

20. A color document image processing method according to claim 19, wherein said binarized brightness information Y' and binarized chrominance data I' and Q' are independently encoded and only said brightness information Y' is stored when an input image is monochro image and said brightness information Y' and chrominance data i' and Q' are stored, in other case, and it is recorded that the input image is color image.

21. A color document image processing method according to claim 19, wherein said multivalue brightness information Y and chrominance data I and Q are binarized by a kind of binarization method selected from a plurality of binarization methods including the artificial binary-halftone process.

22. In a color document image processing apparatus processing document images including color images as digital data, said color document image processing apparatus comprising:

a means for transducing an input RGB multivalue color image data into brightness information Y and chrominance data I and Q;

a means for binarizing said brightness information and chrominance data by the artificial binary-halftone process; and a means for outputting or displaying or storing said binarized brightness information Y' and chrominance data I'' and Q'' as a plurality of binary image.

23. A color document image processing apparatus according to claim 22, comprising:

a means for comparing said multivalue chrominance data I and Q with the predetermined value for every pixel; and a means discriminating whether an input image is a color image or monochro image depending on a result of comparison for every pixel.

24. A color document image processing apparatus according to claim 22, comprising a means for executing a plurality kinds of binarizing systems including the artificial binary-halftone process and a means for selecting a kind of process from said plurality of binarizing systems as the means for binarizing said brightness information Y and chrominance data I and Q.

25. A color document image processing apparatus according to claim 24, comprising a means for obtaining characteristic quantity of input image part, a means for discriminating the domain of each part of image and a means for changing a binarizing system in accordance with a result of said discrimination as the means for selecting the binarizing system.

26. A color document, image processing apparatus according to claim 25, comprising a means for extracting characteristic quantity from brightness information, a means for extracting characteristic quantity from chrominance information and a means for discriminating domains from said two kinds of characteristic quantity as the means for discriminating domains of input image.

27. In a color document image processing apparatus for processing document image including color images as digital data, said color document image processing apparatus comprising:
    a means for reading brightness information Y' and a plurality of chrominance data I', Q' of a sheet of color image data stored or transmitted in the format of binary image;
    a means for transducing said brightness information Y' and chrominance data I', Q' into multivalue brightness information Y" and chrominance data I", Q"; and
    a means for outputting said multivalue brightness information and multivalue chrominance data as multivalue RGB color image data.

28. A color document image processing apparatus according to claim 27, comprising a means for reading said brightness information Y' and chrominance data I', Q' and outputting such signal as a color image, a means for reading only said brightness information Y' as a monochro binary image and a means for changing said two kinds of output means as the means for reading said binary brightness information Y' and binary chrominance data I' and Q'.

29. A color document image processing apparatus and system according to claim 27, comprising a means for scanning Y', I', Q' arranged in two dimensions with a scanning window of n x m pixels, a means for executing the product and sum calculations of the binary data of n x m pixels in said scanning window and predetermined weight coefficient of n x m pixels and a means for outputting the result of said product and sum calculations as the means for transducing said binary brightness information Y' and binary chrominance data I', Q' into the multivalue brightness information Y" and chrominance data I", Q".

30. In a color document image processing apparatus processing document image including color images as digital data, said color document image processing apparatus comprising a means for reading only brightness information from stored brightness information and chrominance data and a means for displaying or printing said brightness information Y' as a monochro binary image as a means for reading brightness information Y' and a plurality of chrominance data I' and Q' of a sheet of color image data stored or transmitted in the format of binary image.

31. A color document image processing apparatus processing images such as a document as digital data, comprising:
    a means for storing image data as binary image data;
    a means for detecting whether said stored binary image data is color image or monochro image; and
    a means for outputting color image data reappeared from said stored binary image data when said stored binary image data is color data, and outputting said stored binary image data as monochro image data when said binary image data is monochro image.

32. A color document image processing apparatus according to claim 31, comprising at least any one of a means for reading signal recorded in a storage medium and a means for inputting a command issued from external circuits as the means for detecting whether said stored image data is color image or monochro image.

33. A color document image processing apparatus according to claim 31, comprising a means for outputting three sheets of said stored binary image data as R, G, B color image data when said stored binary image data is color data, and outputting said stored binary image data as brightness information when said binary image data is monochro image.

34. A color document image processing apparatus according to claim 31, comprising a means for outputting multi-valued color data reappeared as brightness and chrominance information from said stored binary image data when said stored binary image data is color data, and outputting said stored binary image data as binary information of brightness when said binary image data is monochro image.

35. A color document image processing method comprising, as a method for storing or transmitting a document image including color images as digital data the steps of:
    transducing an input RGB multivalue color image data into brightness information Y and chrominance data I and Q;
    binarizing said brightness information and chrominance data by the artificial binary-halftone process; and
    outputting or displaying or storing said binarized brightness information Y" and chrominance data I" and Q" as a plurality of binary image.

36. A color document image processing method according to claim 35, wherein said multivalue chrominance data I and Q are separated and output as the two kinds of multivalue image data $I_p$, $I_n$ and $Q_p$, $Q_n$ consisting of only 0 or positive value.

37. In a color document image processing method for processing document image including color images as digital data, said color document image processing method comprising the steps of:
    reading brightness information Y' and a plurality of chrominance data I' and Q' of a sheet of color image data stored or transmitted in the format of binary image,
    transducing said brightness information Y' and chrominance data I' and Q' into multivalue brightness information Y" and chrominance data I" and Q", and outputting such data by further transducing into multivalue RGB color image data.

38. In a color document image processing method for processing document image including color images as digital data, said color document image processing method comprising the steps of:

reading only brightness information among said stored brightness information and chrominance data, and displaying or printing such data as the monochro binary image as a method of reading and outputting brightness information $Y'$ and a plurality of chrominance data $I'$ and $Q'$ of a sheet of color image data stored or transmitted in the format of binary image.

39. A color document image processing method according to claim 38, wherein the output of color image by reading said brightness information $Y'$ and chrominance data $I'$ and $Q'$ and the output of monochro binary image by reading only said brightness information $Y'$ is selected depending on an object image or apparatus in the case of reading said binary brightness information $Y'$ and binary chrominance data $I'$ and $Q'$.

* * * * *